United States Patent [19]

Adachi et al.

[11] Patent Number: 5,594,307
[45] Date of Patent: Jan. 14, 1997

[54] CURRENT SERVO AMPLIFICATION/CONTROL APPARATUS AND METHOD FOR REVERSIBLE DC MOTOR

[75] Inventors: Kazutaka Adachi, Yokohama; Hideki Sudo, Machida, both of Japan

[73] Assignee: Nissan Motor Co., Ltd., Yokohama, Japan

[21] Appl. No.: 384,892

[22] Filed: Feb. 7, 1995

[30] Foreign Application Priority Data

Feb. 10, 1994 [JP] Japan .................................. 6-016133
May 31, 1994 [JP] Japan .................................. 6-117738

[51] Int. Cl.$^6$ ................................................. H02P 7/00
[52] U.S. Cl. ........................ 318/280; 318/632; 364/151
[58] Field of Search ................................ 318/280–291, 318/256, 257, 549, 609, 610, 611, 623, 632, 601, 608; 364/148, 149, 151–154, 160–163

[56] References Cited

U.S. PATENT DOCUMENTS

| | | | |
|---|---|---|---|
| 4,110,675 | 8/1978 | Wisner | 318/282 X |
| 4,679,136 | 7/1987 | Shigemasa | 318/561 |
| 4,980,618 | 12/1990 | Milnes et al. | 318/286 X |
| 5,389,867 | 2/1995 | Adachi et al. | 318/601 |
| 5,398,298 | 3/1995 | Ensor | 388/811 |
| 5,444,346 | 8/1995 | Sudo et al. | 318/616 |
| 5,483,135 | 1/1996 | Parks | 318/281 X |

FOREIGN PATENT DOCUMENTS

| | | |
|---|---|---|
| 4300366A1 | 7/1993 | Germany . |
| 4300365A1 | 7/1993 | Germany . |
| 6-3871 | 1/1994 | Japan . |

OTHER PUBLICATIONS

"63 Robust Control System for Electric Rear–Wheel–Steering Actuator", Japanese Paper No. 9302187, Society of Automotive Engineering, Hideki Sudo, May, 1993.

*Primary Examiner*—Jonathan Wysocki
*Attorney, Agent, or Firm*—Lowe, Price, LeBlanc & Becker

[57] ABSTRACT

In current servo amplification/control apparatus and method for a reversible DC motor applicable to a vehicular four-wheel steering system, a motor current detection circuit and a motor current feedback circuit are eliminated and a motor counter-electromotive force is estimated using a dynamic characteristic of the motor, a positioning currenu, and an angular displacement information of the motor, and the motor power supply voltage directly measured is corrected using the estimated counter- electromotive force. Thus, a positioning response of the motor is derived which is approximately coincident with a design target even when the motor is rotated at a high speed.

19 Claims, 14 Drawing Sheets

CURRENT SERVO AMPLIFICATION/CONTROL APPARATUS AND METHOD FOR REVERSIBLE DC MOTOR

BACKGROUND OF THE INVENTION

1. Field of The Invention

The present invention relates to current servo amplification/control apparatus and method for a reversible DC motor which are applicable to a vehicular four-wheel steering (4WS) system with a correction of a motor counter-electromotive force (or back-electromotive to force )generated by the rotating DC motor for a terminal (effective) voltage across the motor taken into consideration and without a detection of a current flowing through the DC motor and a motor current feedback circuit.

2. Description of Background Art

A previously proposed current servo amplification/control apparatus which is to be applied to a vehicular motor-driven four wheel steering system is exemplified by FIG. 1.

FIG. 1 generally shows the previously proposed whole controller used for performing a positioning control for the reversible DC motor 1.

As shown in FIG. 1, the controller includes: a motor positioning control/calculating circuit block 2 which calculates a motor current instruction value I* according to an input motor angular displacement (position) instruction value θ* and a feedback motor angular position indicative signal θ; and a current servo amplification/control circuit block 8 which controls a motor input current in accordance with the current instruction value I* derived from the motor positioning control/calculating circuit block 2. The current amplification/control circuit block 3 derives the motor current I which is coincident with the current instruction value I* by detecting an actual motor current I from its current detection circuit block 4 and feeding back the detected motor current I from its current feedback circuit block 5.

However, since, in the controller shown in FIG. 1, a triangular waveform generator, a counterclockwise direction rotation circuit, a clockwise direction rotation circuit are needed in the motor current feedback circuit block 5 and the current detection circuit block 4 to detect the actually flowing motor current I is also needed, a cost of manufacturing the previously proposed motor current amplification/control apparatus (the whole controller shown in FIG. 1) becomes expensive.

SUMMARY OF THE INVENTION

It is therefore an object of the present invention to provide cost-effective current servo amplification/control apparatus and method for a reversible DC motor with no motor current detection circuit and no motor current feedback circuit, which are applicable to a vehicular four-wheel steering (4WS) system, which can achieve a motor positioning response which is approximately coincident with a design target when the DC motor is rotating at.a high speed region, and which can accurately estimate a counter-electromotive force generated by the rotating motor.

The above-described object can achieved by providing an apparatus comprising: a) a reversible DC motor; b) a power transistor circuit which is so constructed as to operatively supply a motor input current to the motor; c) first means for monitoring a power supply voltage $V_E$ across the motor; d) second means for detecting an angular displacement of the motor; e) third means for calculating a target motor input current $I_R^*$ to always make a dynamic characteristic of the motor constant so as to compensate for the dynamic characteristic of the motor; f) fourth means for a motor positioning current $I_M^*$ to derive positioning characteristic and responsive characteristic of the motor which are desired by a designer to achieve; g) fifth means for determining a motor current instruction value I* on the basis of the target motor input current $I_R^*$ and the motor positioning current $I_M^*$; h) sixth means for estimating a counter-electromotive force generated by the motor using the dynamic characteristic made constant at the third means on the basis of the motor positioning current $I_M^*M$ and the angular displacement of the motor; i) seventh means for storing previously measured impedances of the motor and said power transistor circuit; j) eighth means for determining a basic power transistor switching on duration $T_D$ of the power transistor circuit on the basis of the monitored power supply voltage, the counter-electromotive force, and the impedances of the motor and power transistor circuit; and k) a power transistor switching circuit which is so constructed as to control switching on and off of the power transistor circuit on the basis of the motor current instruction value I* and the basic power transistor switching on duration.

The above-described object can also be achieved by providing an apparatus comprising: a) a reversible DC motor; b) a power transistor circuit which is so constructed as to operatively supply a motor input current to the motor; c) first means for monitoring a power supply voltage $V_E$ across the motor; d) second means for detecting an angular displacement of the motor; e) third means for calculating a target motor input current $I_R^*$ to always make a dynamic characteristic of the motor constant so as to compensate for the dynamic characteristic of the motor; f) fourth means for a motor positioning current $I_M^*$ to derive positioning characteristic and responsive characteristic of the motor which are desired by a designer to achieve; g) fifth means for determining a motor current instruction value I* on the basis of the target motor input current $I_R^*$ and the motor positioning current $I_M^*$; h) sixth means for estimating a counter-electromotive force generated by the motor using the dynamic characteristic made constant at the third means on the basis of the motor positioning current $I_M^*$ and the angular displacement of the motor; i) seventh means for storing previously measured impedances of the motor and said power transistor circuit; j) eighth means for determining a basic power transistor switching on duration $T_D$ of the power transistor circuit on the basis of the monitored power supply voltage, the counter-electromotive force, and the impedances of the motor and power transistor circuit; and k) a power transistor switching circuit which is so constructed as to control switching on and off of the power transistor circuit on the basis of the motor current instruction value I* and the basic power transistor switching on duration.

The above-described object can also be achieved by providing a method of a current servo amplification/control for a reversible DC motor, comprising the steps of: a) detecting a power supply voltage ($V_E$) by which a power to drive the DC motor is supplied via a power transistor circuit connected across the motor; b) detecting a rotation angular position θ of the motor; c) receiving the angular position θ of the motor, converting a motor dynamic characteristic into an identified model having a constant linearlzed (linear) transfer function, and calculating and outputting a motor dynamic characteristic compensation current ($I_R^*$, $I_{RB}$) such that a response of the motor is coincident with the identified model; d) responding to a motor rotation instruction value ($\theta^*$ $\theta_B$) from an external calculating and outputting a motor rotation positioning current ($I_M^*$, $I_{MB}$) to achieve a rotation positioning of the motor and rotation positioning response of the motor which are desired by a designer of the apparatus; e) receiving the motor dynamic characteristic compensation current ($I_R^*$, $I_{RB}$) and the motor positioning current ($I_M^*$, $I_{MB}$) and determining a motor input current instruction value ($I_R^*$, $I_{RB}$) on the basis of the motor dynamic characteristic compensation current ($I_R^*$, $I_{RB}$) and the motor positioning current ($I_M^*$, $I_{MB}$); f) receiving the motor angular position ($\theta$) and at least the motor positioning current ($I_M^*$, $I_{MB}$) of said model matching control means, estimating an angular velocity ($d\theta\#$, $d\theta_H$) of the motor using the constant linearized transfer function on the basis of the angular position ($\theta$) and motor positioning current ($I_M^*$, $I_{MB}$), and estimating a counter-electromotive force ($V_R$, $V_{RB}$) generated in said rotating motor from the estimated angular velocity ($d\theta\#$, $d\theta_H$) of the motor; g) storing previously measured specification values of said motor, operational parameters in linearized transfer function, and internal impedances of said power transistor circuit; h) receiving the specification values of said motor, the impedance values of said power transistor circuit, the motor power supply voltage value ($V_E$), and estimated counter-electromotive force value ($V_R$, $V_{RH}$) and calculating a basic switching on duration ($T_D$) for said power transistor circuit on the basis of the received values thereinto; and i) generating the switching on signal ($T_{ON}$) to be supplied to said power transistor circuit on the basis of the motor input current instruction value ($I^*$ $I_B$) and the basic switching on duration ($T_D$).

BEST MODE CARRYING OUT THE INVENTION

Reference will hereinafter be made to the drawings in order to facilitate a better understanding of the present invention.

First Embodiment

Figure 1:
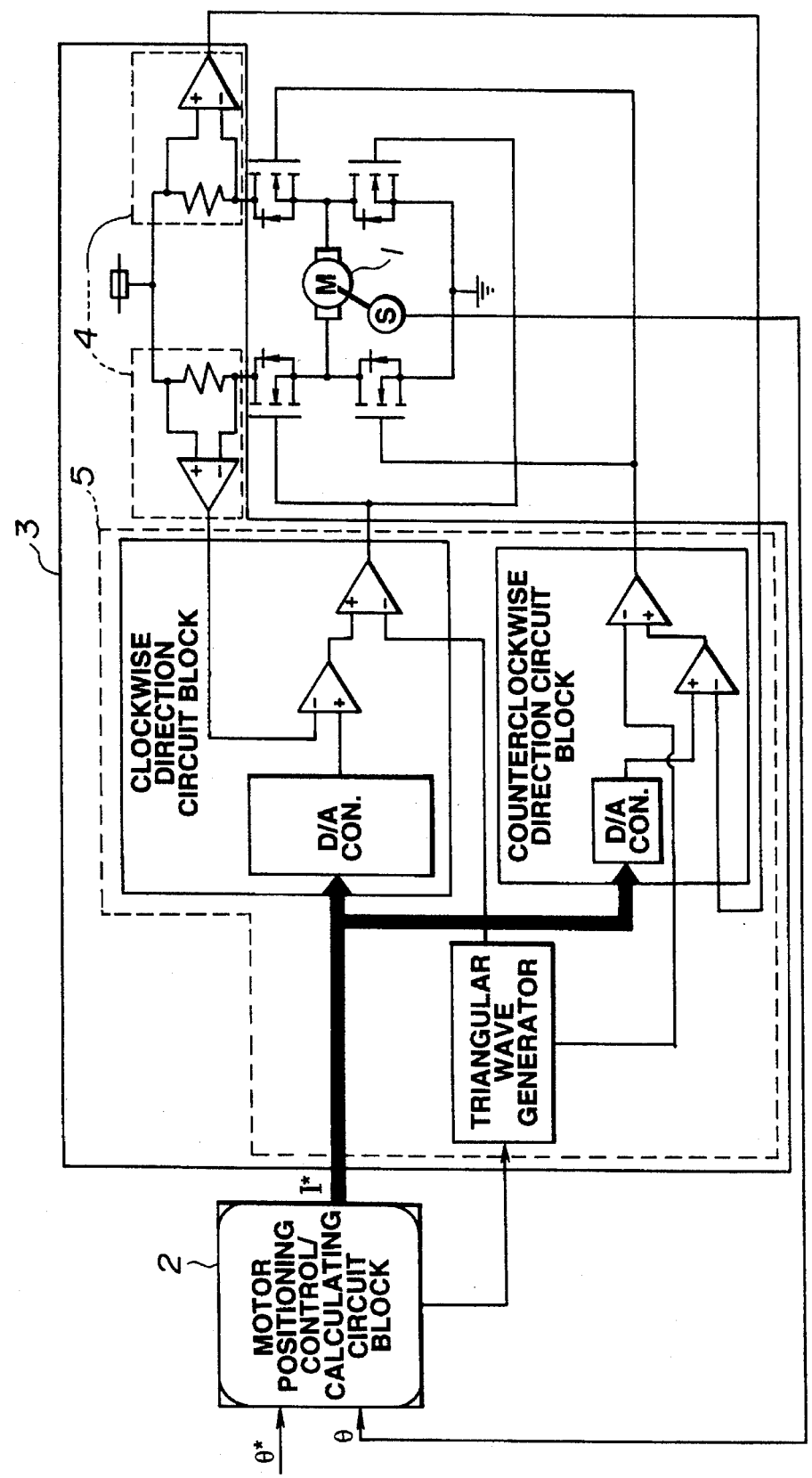
FIG. 1 is a circuit block diagram of a previously proposed current servo amplification/control apparatus for a reversible DC motor described in the BACKGROUND OF THE INVENTION.
Figure 2A:
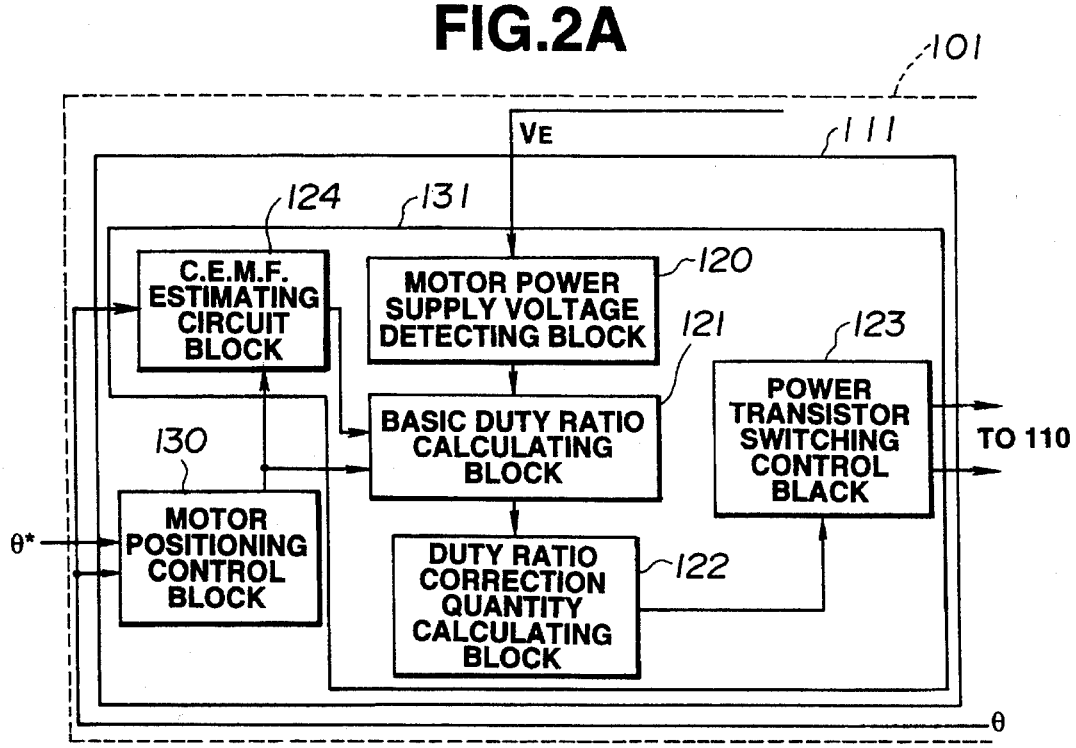
FIGS. 2A and 2B are integrally circuit block diagram of a current servo amplification/control apparatus for the reversible DC motor in a first embodiment according to the present invention.
Figure 2B:
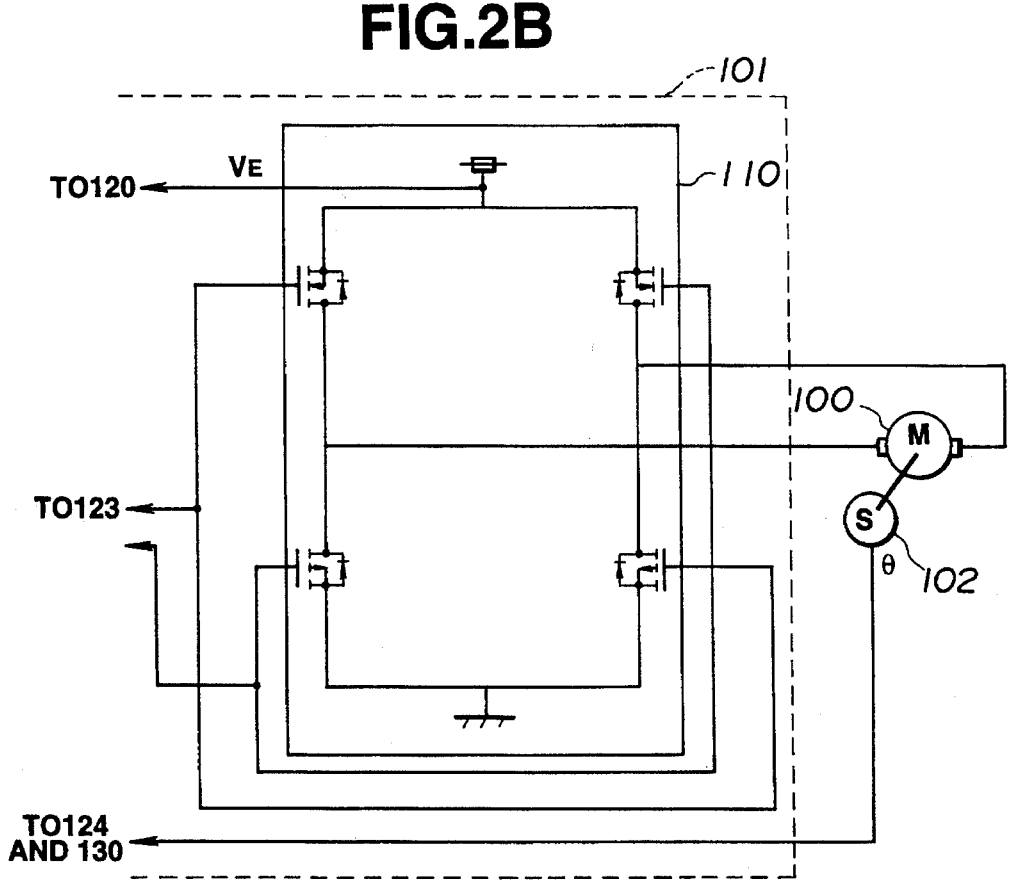

FIGS. 2A and 2B show integrally a circuit block diagram of a current servo amplification/control apparatus for a reversible DC motor in a first embodiment according to the present invention.

As shown in FIGS. 2A and 2B, the reversible DC motor 100 has one end connected to a source of a first (power) MOS transistor and to a drain of a second (power) MOS transistor and has the other end connected to a source of a third (power) MOS transistor and to a drain of a fourth (power) MOS transistor. A DC positive power supply $V_E$ is connected to each drain of the first and third MOS transistors. Each source of the second and fourth MOS transistors is grounded. The structure of a power transistor circuit 110 connected across the DC motor 100 is exemplified by a United States Patent Application Ser. No. 08/189,872 filed on Feb. 1, 1994 (, the disclosure of which is herein incorporated by reference). A sensor 102 which is so constructed as to detect an angular displacement (position) of the DC motor 100 is exemplified by a United States Patent Application having a priority based on a Japanese Patent Application No. Heisel 6-10772 (flied on Feb. 2, 1994). In FIG. 2B, numeral 110 denotes a power transistor circuit.

A whole controller 101 further includes an arithmetic operation unit 111 which receives a motor angular position indicative signal θ from the sensor 102, a monitored motor power supply voltage $V_E$, and a motor angular position instruction value θ* from an external of the controller 101 and outputs power transistor switching control signals to either two of respective gates of the power MOS transistor circuit 110 according to the motor rotational direction.

The arithmetic operation unit 111 is constituted by a motor positioning control circuit block 130 and a current servo amplification/control circuit block 131. The arithmetic operation unit 111 is constituted by a electronic control unit generally including a microcomputer.

Figure 3:
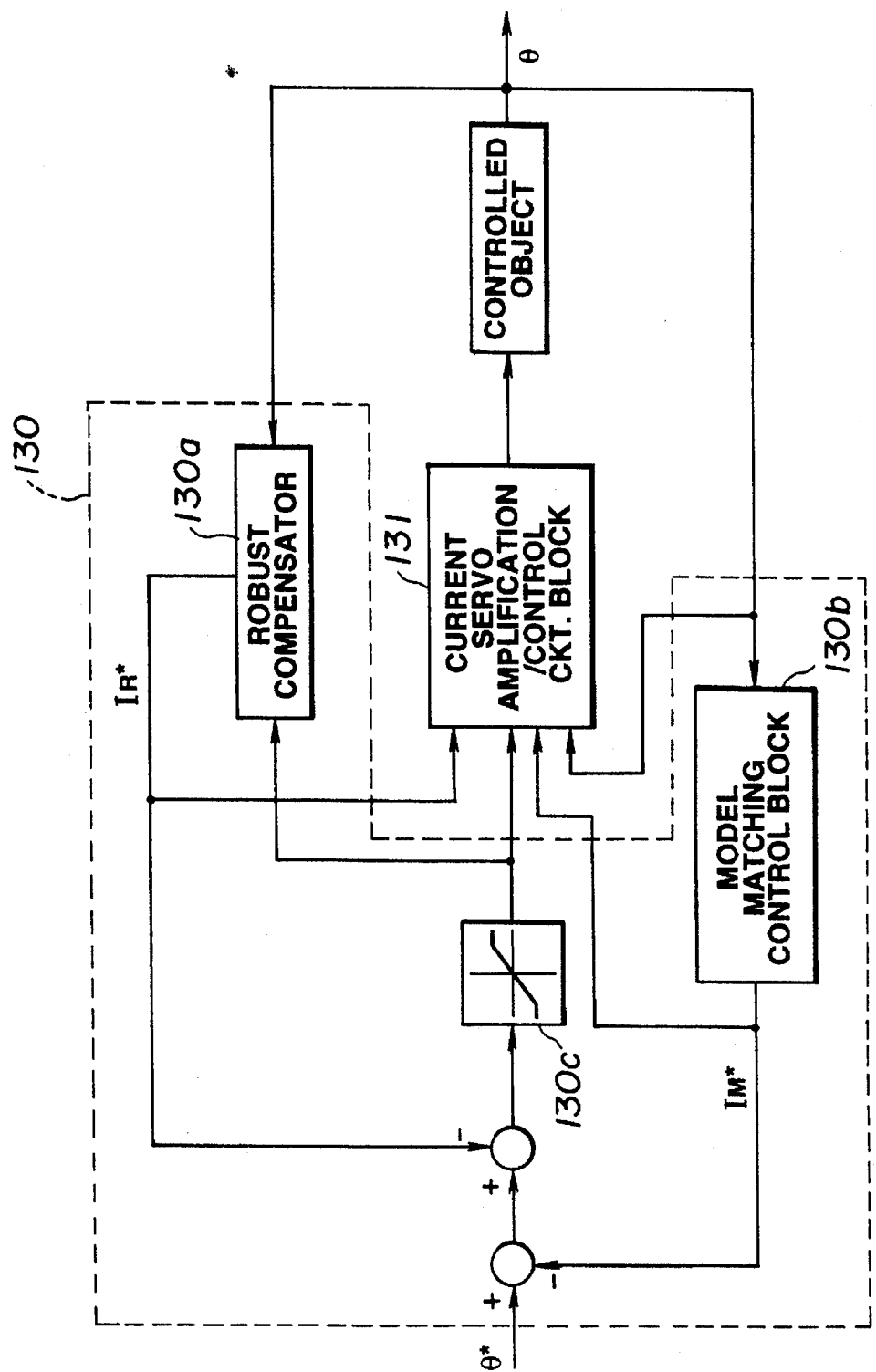
FIG. 3 is an internal circuit block diagram of a motor positioning control circuit block 130 of FIG. 2A.

FIG. 3 shows a circuit block diagram of the motor positioning control circuit block 130 (shown in FIG. 2A) of the current servo amplification/control apparatus which is applicable to a vehicular motor-driven four wheel steering system which controls a rear road wheel steering angle via a rear road wheel steering mechanism. Thus, the motor positioning control circuit block 130 forms a motor positioning controller.

As shown in FIG. 3, the motor positioning control circuit block 180 includes: a robust compensator 130a; a model matching control circuit block 130b; and a motor input current limiter 130c.

The robust compensator 130 is so constructed as to compensate for a non-linearity characteristic of a controlled object (actuator) and an error model caused by the controlled object using a robust compensation technique and as to control the controlled object so as to always provide the controlled object for a linearized model set by the designer.

The model matching control circuit block 130b (also called, a model matching compensator) is so constructed as to control a response of the controlled object to the input of the controlled object so that the controlled object can provide the desired response for the designer.

The motor input current limiter 130c outputs the current instruction value I* to the current servo amplification/ control circuit block 131 and to the robust compensator 130a with a limitation placed on a maximum value of an added result (in a previous stage of a subtractor) of an output $I_R^*$ of the robust compensator 130a and an output $I_M^*$ of the model matching control circuit block 130b (with a capacity of circuit elements in the power transistor circuit 110 and so forth taken into consideration).

The robust compensator 130a is exemplified by United States Patent Application Ser. No. 07/998,916 (now allowed) filed on Dec. 30, 1992 (which corresponds to a German Patent Application First Publication No. DE 43 00 366 A1) and Ser. No. 07/998,914 filed on Dec. 30, 1992 (which corresponds to a German Patent Application First Publication No. DE 43 00 365 A1) (, the disclosures of which are herein incorporated by reference). The model matching control circuit block 130b (including the robust compensator 130a) is exemplified by a Japanese paper of a SAE (Society of Automotive Engineering) No. 9302187 titled No. 62 Robust Control System for Electric Rear- Wheel-Steering Actuator published on May, 1993.

In details, the robust compensator 130a receives the motor angular position signal θ from the sensor 102 (the sensor 102 is generally constituted by a potentiometer), converts a motor dynamic characteristic into an identified model having a constant linearized transfer function (the equation of the transfer function will be described below) and calculates and outputs the motor dynamic characteristic compensation current $I_R^*$ such that a response of the controlled object (actuator or motor) is coincident with the identified model.

The model matching control circuit block 130b, responsive to the motor rotation instruction value θ* from the external of the controller 101, calculates and outputs the motor positioning current $I_M^*$ to achieve a rotation positioning and rotation positioning response of the motor to the angular position instruction value which are desired by a designer of the controller 101 including the actuator (controlled object).

Each result of the above-described calculations, i.e., the motor current instruction value I* a motor dynamic characteristic compensation current $I_R^*$, a motor positioning current $I_M^*$, and the motor angular position θ are output to the current amplification/control circuit block 131.

The current servo amplification/control circuit block 131, as shown in FIG. 2A, includes: a motor power supply voltage monitoring (detecting) circuit block 120; a basic DUTY ratio calculation circuit block 121; a DUTY ratio correction quantity calculation circuit block 122; a power transistor switching control circuit block 123; and the motor counter-electromotive force (c. e. m. f.) estimating circuit block 124.

The motor power supply voltage monitoring circuit block 120 serves to detect (monitor) the power supply voltage $V_E$ to be applied across the motor 100 via the power transistor circuit 110 from a line connected to the positive power supply shown in FIG. 2B.

The basic DUTY ratio calculating circuit block 121 calculates a ratio between a switching on duration and a switching off duration (PWM (Pulse Width Modulation)-DUTY ratio) at each power transistor switching period $F_W$ according to previously measured internal resistance of the motor 100 and on resistances of the respective power transistors of the power transistor circuit 110 and the monitored power supply voltage $V_E$ and calculates a basic output stage switching time duration $T_D$ as will be described later.

The DUTY ratio correction quantity calculating circuit block 122 calculates a correction quantity (duration of time) of the basic output stage switching time duration $T_D$ calculated by the basic DUTY ratio calculating circuit block 121 so as to derive a corrected (corrective value used for correction) output stage switching time duration $T_C$ as will be described later.

The power transistor switching control circuit block 128 outputs the power transistor control signals used to control the switching operations of the power transistor circuit block 110 on the basis of a time duration $T_{ON}$ of an added value of the basic output stage switching time $T_D$ and the corrected output stage switching time $T_C$ and the motor current instruction value I* derived from the motor input current limiter 130c shown in FIG. 3.

Figure 4:
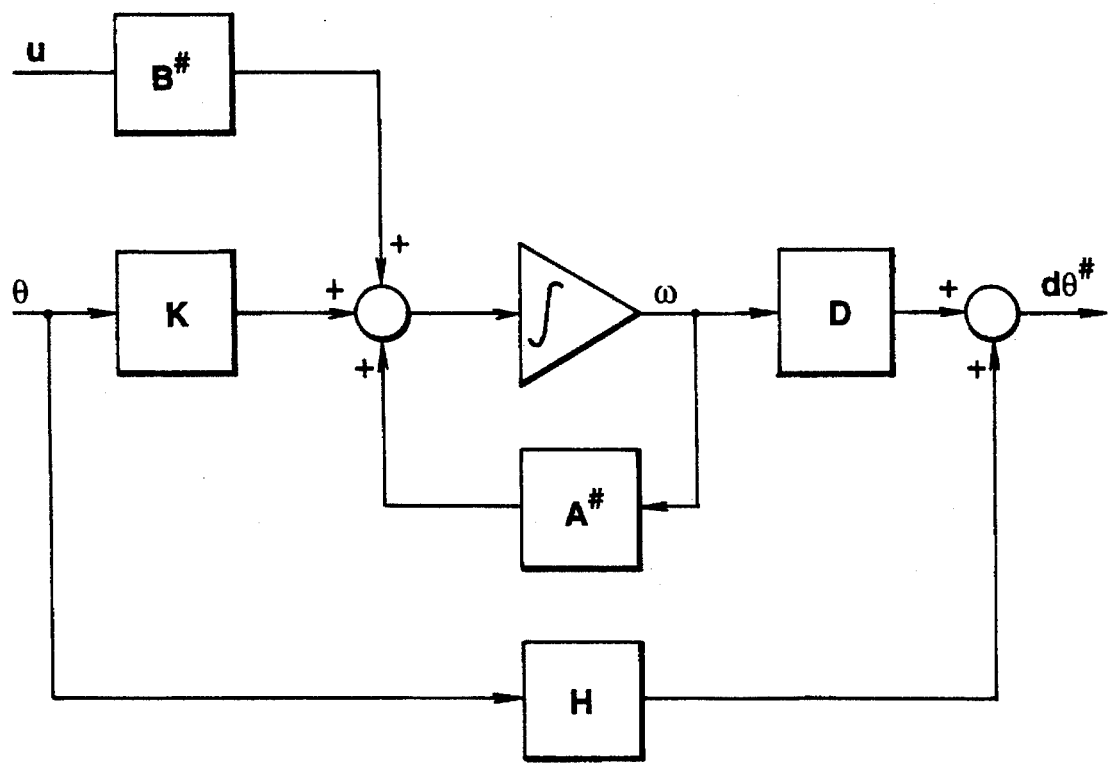
FIG. 4 is a circuit block diagram of a motor angular velocity estimator formed in a motor counter-electromotive force estimating circuit block 124 shown in FIG. 2A.

FIG. 4 shows a motor angular velocity estimator modeled in the motor counter-electromotive force estimating circuit 124.

The motor counter-electromotive force estimating circuit block 124 shown in FIG. 2A is constituted by the motor angular velocity estimator shown in FIG. 4 according to the linearized transfer characteristic of the controlled object by means of the robust compensator 130a. The motor counter-electromotive force estimating circuit block 124 receives the motor current instruction value I* (from the limiter 130c), the motor positioning current $I_M^*$ (from the model matching control circuit block 130b), and the motor angular position θ (from the sensor 102).

The motor counter-electromotive force estimating circuit block 124 finally estimates the counter- electromotive force $V_R$ generated by the rotating motor 100 from the estimated motor angular velocity $d\theta\#$ of the motor angular velocity estimator shown in FIG. 4 and from a previously measured specification value, i.e., a counter-electromotive force constant $K_R$ as will be described later. It is noted that such motor specification values, constants, and other natural values on the power transistor circuit 110 are previously measured and stored in a memory of the electronic control unit.

A superscript * denotes a target value (or so-called, a desired value) and # denotes an estimated value in the first embodiment.

Next, an operation of the current servo amplification/control apparatus in the first embodiment will be described below.

[Operation Processing of Current Servo Amplification/Control]

Figure 5:
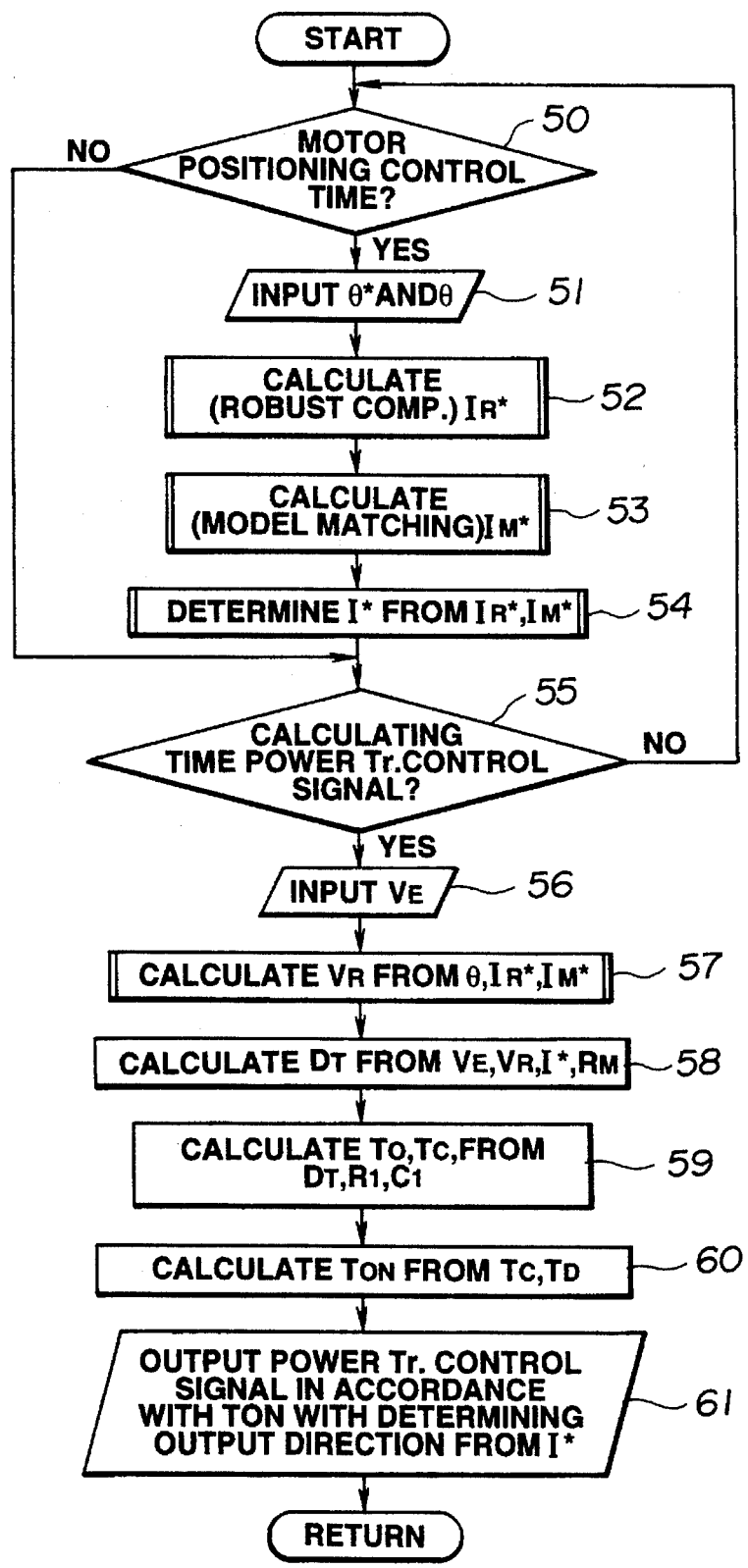
FIG. 5 is an operational flowchart executed by the current servo amplification/control apparatus shown in FIGS. 2A and 2B.

FIG. 5 shows an operational flowchart of the arithmetic operation unit 111 to execute a motor current servo amplification/control operation.

It is noted that the arithmetic operation unit 111 is referred hereinbelow to as the controller.

At a step 50, whether the controller 111 determines whether it is the motor positioning time of the motor 100. If Yes at the step 50, the routine goes to a step 51. If No at the step 50, the routine goes to a step 55 as will be described below.

At the step 51, the controller 111 receives the motor angular position signal $\theta$ from the sensor 102 and motor angular position instruction value $\theta^*$.

At a step 52, the robust compensator 130a of the controller 111 calculates the dynamic characteristic compensation current $I_R^*$ using the robust compensating technique on the basis of the input motor angular position $\theta$ and the motor input current instruction value $I^*$ derived at a previously executed routine of FIG. 5.

At a step 53, the model matching control circuit block 130b of the controller 101 calculates the motor positoning current $I_M^*$ using the model matching compensating technique on the basis of the input $I^*$ and $\theta$.

At a step 54, the controller 111 determines the motor current instruction value $I^*$ according to the calculated motor dynamic characteristic compensation current $I_R^*$ and the calculated motor positioning current $I_M^*$.

At the step 55, the controller 111 determines whether it is the calculating time of the power transistor control signal. If YES at the step 55, the routine goes to a step 56. If NO at the step 55, the routine returns to the step 50.

At the step 56, the motor power supply detecting block 120 of the controller 111 receives the voltage $V_E$ which is the power supply voltage of the motor 100.

It is noted that although, at a step 57 shown in FIG. 5, the counter-electromotive force $V_R$ generated by the rotating motor 100 is calculated by the motor counter-electromotive force estimating circuit block 124, the estimation of the counter-electromotive force generated by the rotating motor 100 will be described below.

The linearized transfer characteristic of the controlled object is expressed as follows:

$$\theta = n_{m0}/(s^2 + d_{m1}s + d_{m0}), \text{ wherein } s \text{ denotes a differential operator (Laplace transform operator)} \quad (1).$$

In the equation (1), $n_{m0}$, $d_{m0}$, and $d_{m1}$ denote dynamic operation parameters such as inertia moment, viscous braking coefficient, and spring constant and have specific numerical values (for example, $n_{m0}$ indicates 487.6, $d_{m1}$ indicates 20.8, and $d_{m0}$ indicates 11.4) according to the actual experiment when the DC motor 100 is connected to the rear road wheel steering mechanism provided at a rear connecting rod of the vehicular rear suspension having a speed reduction gear and return spring.

In addition, a state equation of the motor angular velocity estimator shown in FIG. 4 is expressed as follows (the motor angular velocity estimator shown in FIG. 4 is a minimal order observer):

$$d\omega/dt = A\# \cdot \omega + K\theta + B\# \cdot u \quad (2)$$

$$d\theta^* = D\omega + H\theta \quad (3),$$

wherein
u denotes a motor angular velocity estimator input ($=I_M^*$),
$A\# = -d_{m1} - L$,
$B\# = Ln_{m0}$,
$K = -L(d_{m1} + L) - d_{m0}$,
$H = L$
$d\theta\#$ denotes the estimated value of a motor angular velocity,
D denotes an output matrix of the minimal order observer and indicates 1, and
L denotes a constant arbitrarily set by the designer.

The counter-electromotive force $V_R$ generated (regenerated) by the rotating motor 100 can be estimated from the following equation using the previously measured specification value of the reversible DC motor 100, i.e, a counter-electromotive force constant $K_R$.

$$V_R = K_R \cdot d\theta\# \quad (4).$$

At a step 58, a PWM-DUTY ratio $D_T$ as the ratio of the switching on period for each power transistor switching period $F_W$ is calculated from the following equation (5) in which a term of $(V_E - V_R)$ corrected according to a subtraction of the estimated counter-electromotive force $V_R$ from the detected motor power supply voltage $V_E$, i.e., $(V_E - V_R)$:

$$I_{MAX} = (V_E - V_R)/R_M \quad (5),$$

wherein $R_M$ denotes a previously measured armature equivalent resistance.

$$D_T = I^*/I_{MAX} \quad (6).$$

Figure 10A:
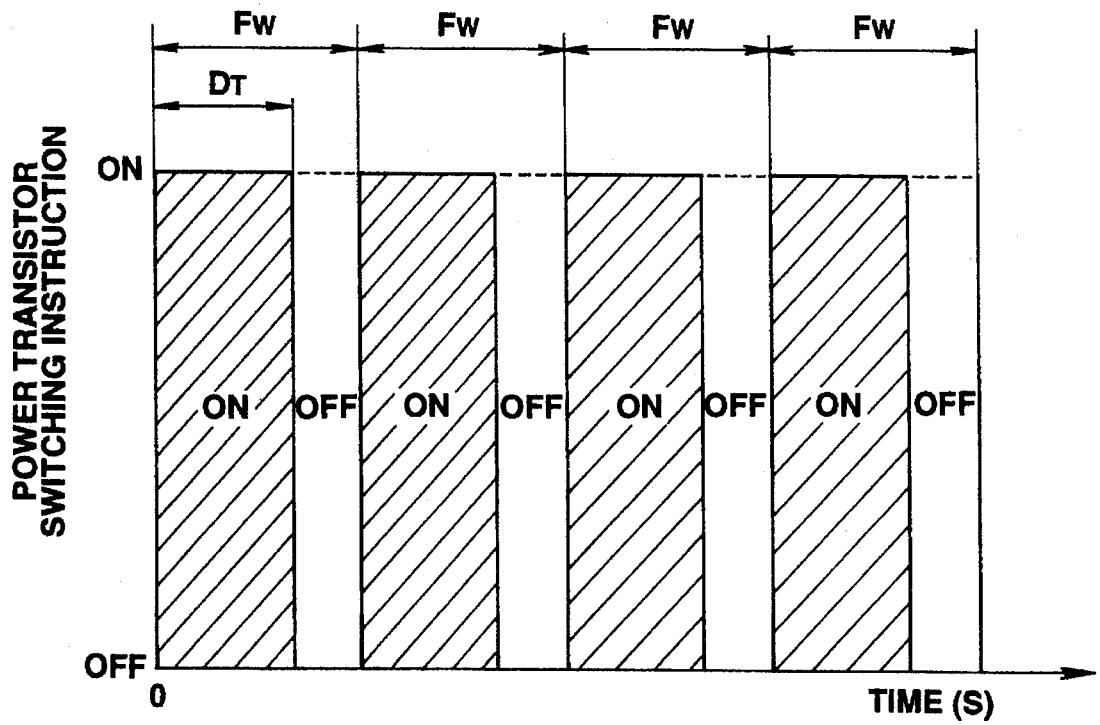
FIG. 10A is an explanatory view of a relationship between switching on-and-off period $F_W$ and a basic power transistor on duty ratio $D_T$ calculated in the first embodiment shown in FIG. 5.
Figure 10B:
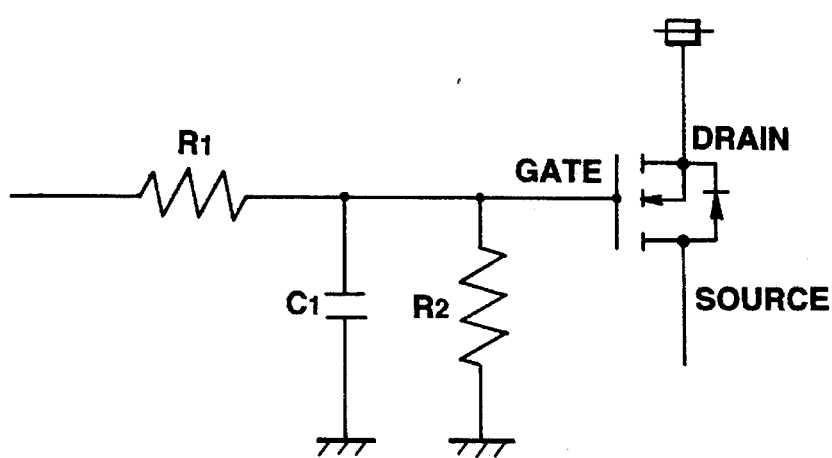
FIG. 10B is an explanatory view of an equivalent circuit of a power transistor gate, the power transistor being connected to the reversible DC motor shown in FIG. 2A.
Figure 10C:
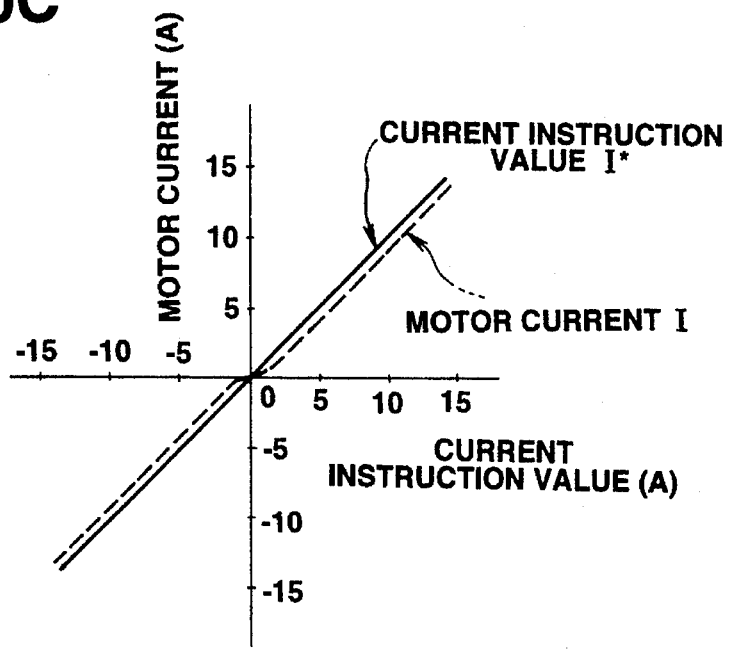
FIG. 10C is an explanatory characteristic graph of a relationship between a motor current I and a current instruction value I* in the other previously proposed current servo amplification/control apparatus.

However, it is noted that, only in the current servo amplification/control method in which the motor current I is controlled by switching (turning) on and off the power transistor circuit 110, the motor applied voltage (the applied voltage across the DC motor 100) has a waveform (refer to FIG. 10D) such as to have a delayed rising edge (denoted by $S_G$ in FIG. 10D) at a start of an initial current flowing side due to an inherent response delay of a gate voltage $V_C$ caused by an inherent resistance $R_1$ (including wiring resistance) and a gate stray capacitance $C_1$ by which each power transistor inherently has (refer to FIG. 10B) and a switching delay of the gate of each power transistor (due to a presence of a gate-source resistance $R_2$ or so on) so that the motor current instruction value $I^*$ and the motor current I actually flowing through the DC motor do not coincide with each other (refer to FIG. 10C). Such inherent resistances and capacitance as described above are derived from the data sheets of each power transistor.

Figure 10D:
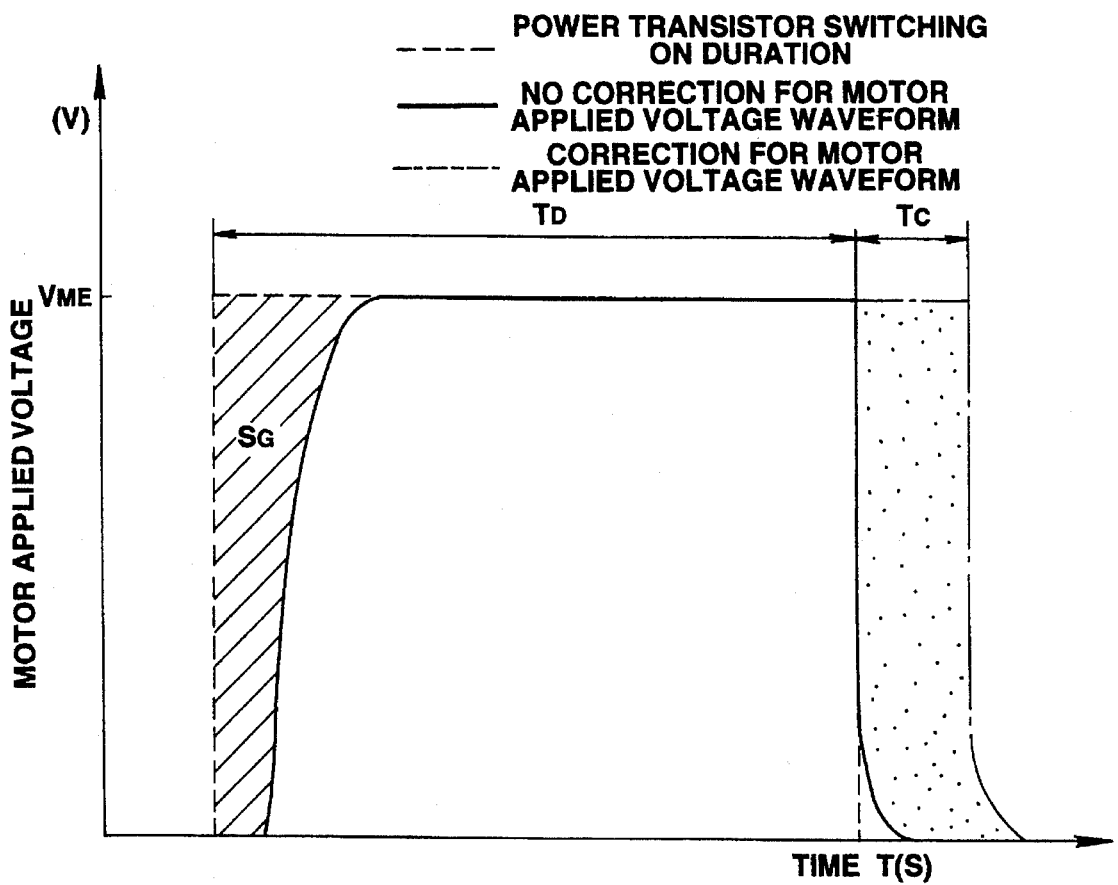
FIG. 10D is an explanatory view for explaining a calculated final power transistor on duration $T_{ON}$ (=$T_D$+$T_C$) in the current servo amplification/ control apparatus shown in FIGS. 2A and 2B.

Therefore, the gate switching on timing is extended so as to make an area of an time extended portion of the gate switching on timing equal to a defect part $S_G$ of the motor supplied voltage $V_M$ with respect to the power transistor switching reference signal caused by such response delays as described above (refer to FIG. 10D). In FIG. 10D, $V_{ME}$ denotes an effective motor applied voltage.

First, the area of the defect part $S_G$ of the motor applied voltage $V_{ME}$ is calculated using the following equations.

$$S_G = V_{ME} \cdot T_D - \int \{1 - \exp(-t/T_G)V_{ME}\}dt + V_{ME} \cdot T_D \qquad (7)$$

$$L_G = V_{ME} \cdot T_D - [t + \exp(-t/T_D)/T_G] \cdot V_{ME} + 0$$

$$V_{ME} \cdot L_G = (V_{ME}/T_G)\{1 - \exp(-T_D/T_G)\} + V_{ME} \cdot L_G,$$

wherein $T_G = R_1 \cdot C_1$, (gate resistance and gate stray capacitance,) $T_D = D_T/F_W$, (power transistor on basic time duration,) and $L_G$ denotes a gate switching delay time. Hence, the switching extended time $T_C$ is as follows:

$$T_C = (1/T_G)\{1 - \exp(-t/T_G)\} + L_G \qquad (8),$$

wherein the above-mentioned respective values of $L_G$, $R_1$, and $C_1$ are previously measured or derived from the specifications on the apparatus individual elements and experiments described above. In addition, the switching extended time $T_C$ may be determined according to the map of the memory in which the extended time $T_c$ is a function of the power transistor on basic duration in time $T_D$.

As described above, the series of operations at the steps 57 through 59 have been described.

At a step 60, the power transistor switching time $T_{ON}$ is calculated by the circuit block 123 using the following equation (9) from the power transistor on basic duration in time $T_D$ and the switching on extended time $T_C$ of each gate of the power transistor circuit 110:

$$T_{ON} = T_D + T_C \qquad (9).$$

At a step 61, an output direction (,i.e., normal direction or reverse direction) is determined from the motor current instruction value I* and in accordance with the power transistor switching time $T_{ON}$ the power transistor switching control signal is output from the power transistor switching control block 123 to the power transistor circuit 110.

When the above-described calculation processing on the basis of FIG. 5 is executed, a high consistency between the motor current instruction value I* and the actual motor flowing current I at the time of the positioning response such that the motor 100 rotates at a high speed region and highly responsive characteristic can be achieved.

[Another example (modification of the first embodiment) of the estimation of the counter-electromotive force]

In the counter-electromotive force estimation method, the motor positioning current IM*, which is the output of the model matching control circuit block 130b, is used for the input u of the motor angular velocity estimator shown in FIG. 4 (refer to the equations (2) and (3). As described above, the model matching control block 130b serves to provide the desired response for the controlled object.

However, in a case where a maximum value of the motor current instruction value I* which is the added result between the motor dynamic characteristic compensating current $I_R*$ and the motor positioning current $I_M*$ is limited, a contributivity (contribution factor) of the motor positioning current $I_M*$ to the input current through the DC motor 100 is not evident.

Therefore, the following condition is added to determine the input u of the motor angular velocity estimator shown in FIG. 4. Therefore, it is possible to estimate the angular velocity of the motor 100 more accurately.

When $I^* \leq I_{max}$, $u = I_M^*$

When $I^* > I_{max}$ and $I_M^* \leq I_{max}$, weights between the robust compensator 130a and the model matching controller 130b in the positioning control system (130) are the same. Therefore, $u = I_M^* - \{I_R^* - (I_{max} - I_M^*)\}/2$.

When $I^* > I_{max}$ and $I_M^* > I_{max}$, $u = I_{max}$. It is noted that $I_{max}$ in this modification is a limitation value of the motor input current limiter 130c, namely, I*, shown in FIG. 3.

[Results of simulations]

Figure 6A:
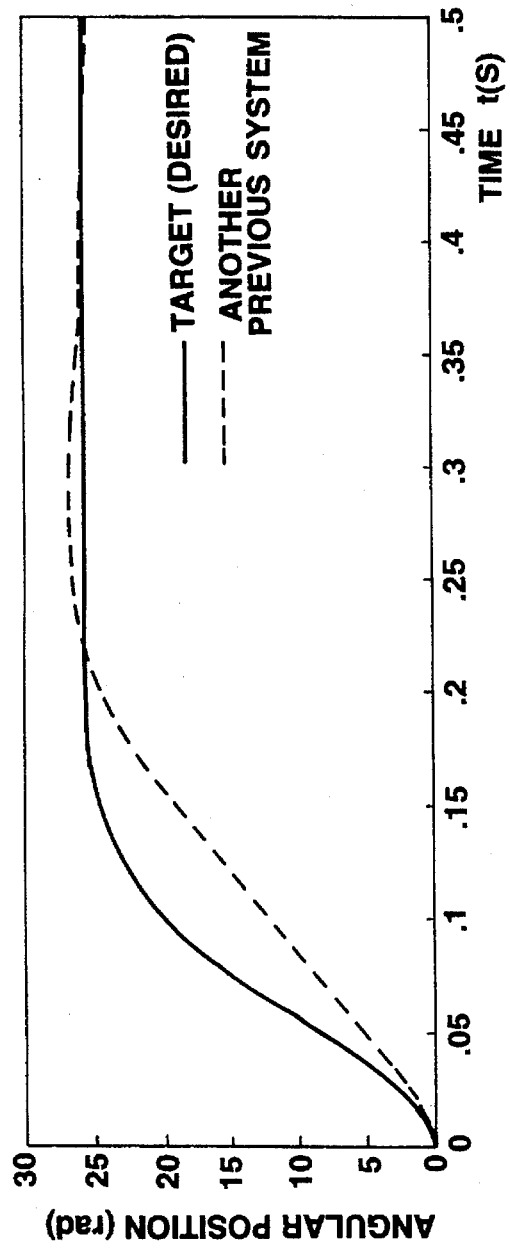
FIGS. 6A and 6B and 7A and 7B are characteristic graphs of motor angular velocity and motor applied voltage as results of simulations using the apparatus shown in FIGS. 2A and 2B and using another previously proposed current servo amplification/control apparatus in which no estimation of the motor counter-electromotive force is carried out.
Figure 6B:
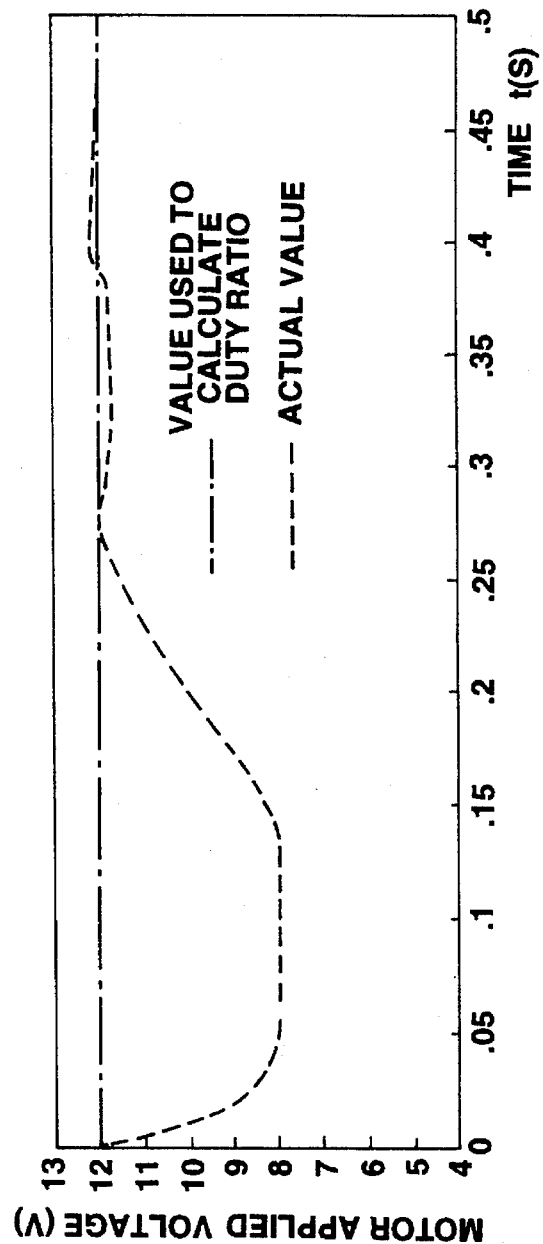

FIG. 6A and 6B shows actual step response characteristics of the angular position (radian) of the DC motor 100 and of the motor applied voltage (volts) with no consideration of the motor counter-electromotive force $V_R$ (broken lines of FIGS. 6A and 6B).

As shown in FIGS. 6A and 6B, a large deviation of the angular position of the motor occurs with respect to a target characteristic (a solid line in FIG. 6A) since the value used to calculate the DUTY ratio is given by a constant voltage, with no correction of the motor applied voltage by the counter-electromotive force generated in the rotating motor.

Figure 7A:
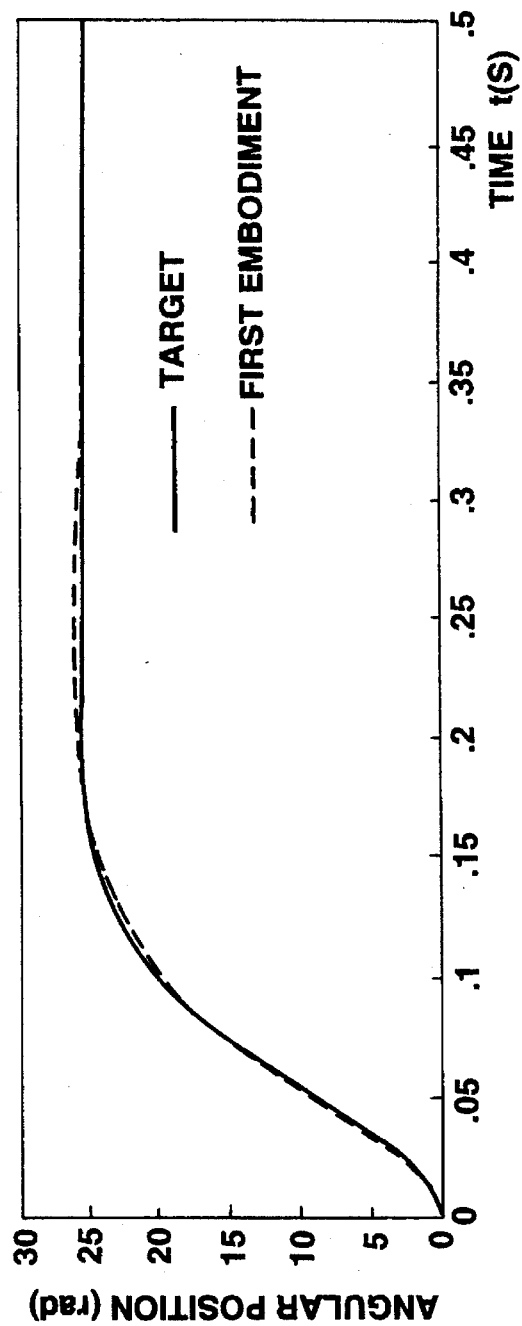
Figure 7B:
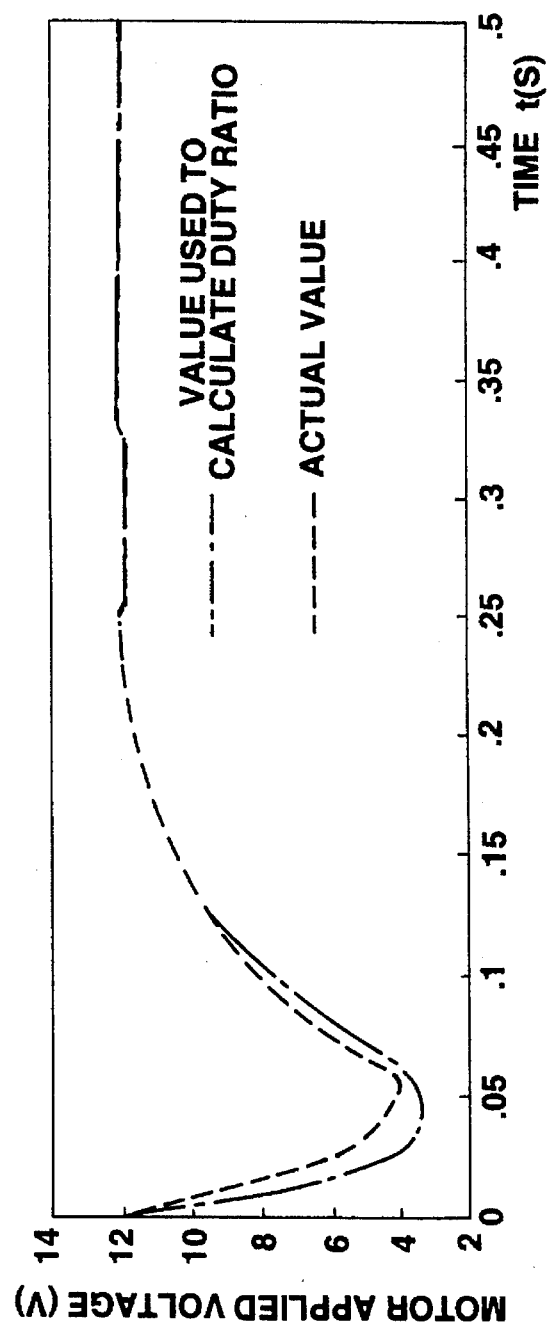

On the other hand, FIGS. 7A and 7B show the step response characteristics in a case where the first embodiment described above is applied as the controller of the current servo amplification.control apparatus.

Since the estimated motor counter-electromotive force $V_R$ is used to correct the motor supplied (applied) voltage so that the value (dot-and-dash line in FIG. 7B) used to calculate the DUTY ratio approaches the actual value (a broken line in FIG. 7B), the consistency of the actual characteristic (the broken line in FIG. 7A) to the target characteristic (the solid line in FIG. 7A) was high (,i.e., the actual response characteristic was confirmed to become approximately approached to the target characteristic).

Figure 8:
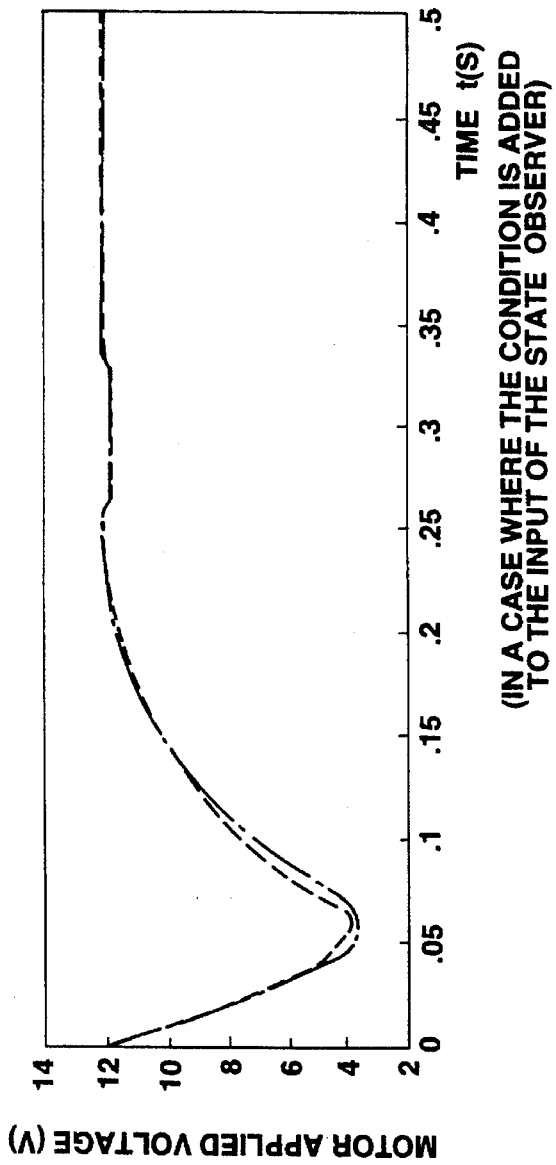
FIG. 8 is characteristic graphs of the motor applied voltage as the result of simulation using the apparatus shown in FIGS. 2A and 2B in a case where a condition is not added to a state observer (the motor angular velocity estimator) input u.

FIG. 8 shows the motor applied voltage characteristics in a case where the present invention is applied to the motor current servo amplification/control apparatus and no condition for the input (u) of the state observer is added.

Figure 9:
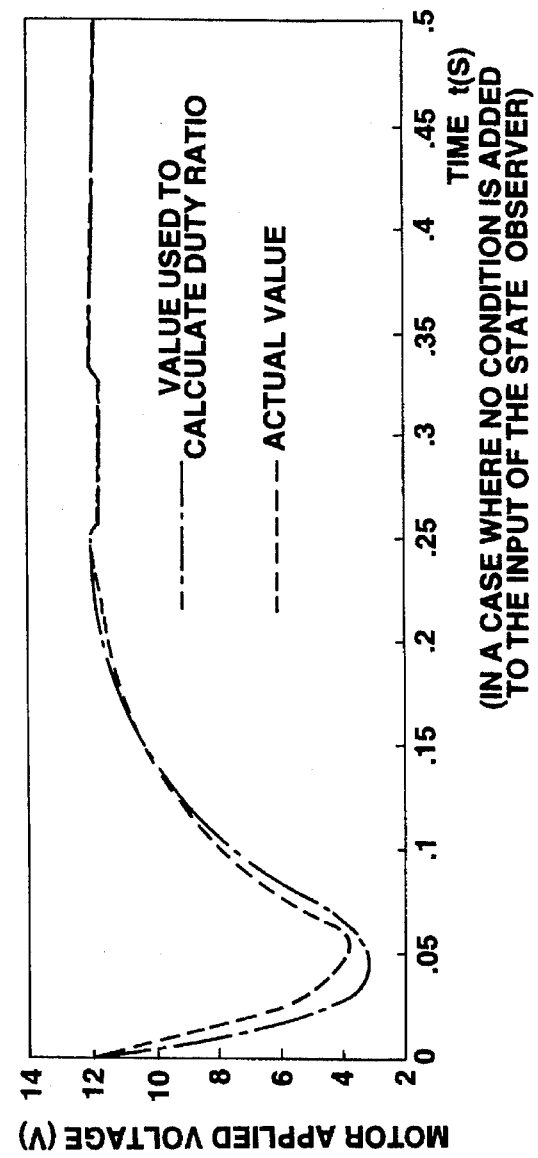
FIG. 9 is characteristic graphs of the motor applied voltage as the result of simulation using the apparatus shown in FIGS. 2A and 2B in a case where any one of conditions is added to the state observer input u (as a modification of the first embodiment).

FIG. 9 shows the motor applied voltage characteristics in a case where the present invention is applied to the motor current amplification/control apparatus and the condition for the input (u) of the state observer is added.

As the results of the simulations shown in FIGS. 8 and 9, it was confirmed that a more accurate motor counter-electromotive force could be estimated when the condition (described in the other example (modification of the first embodiment) is added to the input u of the motor angular velocity estimator (state observer, i.e., the minimal order observer).

(Second Embodiment)

Figure 11:
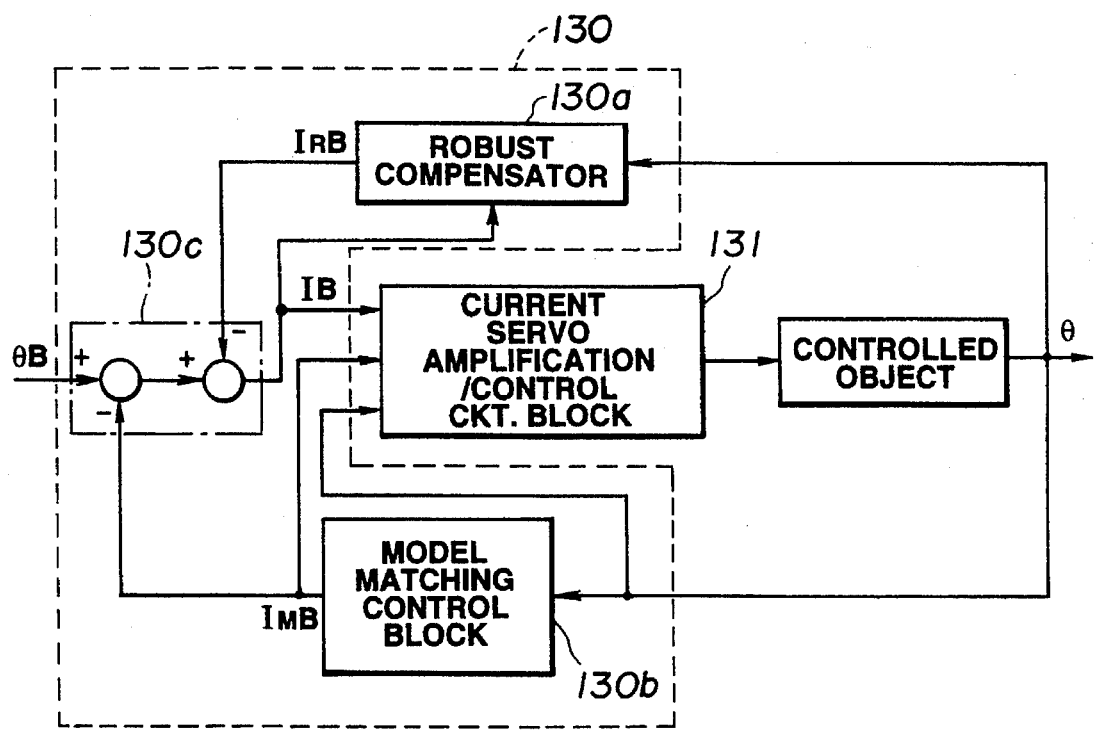
FIG. 11 is a circuit block diagram of another motor positioning control block 130 in a case of a second preferred embodiment of the current servo amplification/control apparatus according to the present invention.

FIG. 11 shows a second preferred embodiment of the current servo amplification/control apparatus according to the present invention.

It is noted that the whole configuration of the DC motor controller 101 in the second embodiment is the same as in the first embodiment shown in FIGS. 2A and 2B.

In the first embodiment, the estimation of the motor counter-electromotive force ($V_R$) is carried out using the estimation of the motor angular velocity. Usually, the angular velocity of the DC motor is limited by the magnitude of the motor applied voltage (physical characteristic of the motor).

Since no limitation is placed on the estimated value of the angular velocity in the ease of the first embodiment, it is generally not possible to more accurately estimate the counter-electromotive force generated by the rotating motor 100 in a ease where the motor is rotating at its maximum speed range. Thus, since the motor current instruction value I* becomes larger than necessary, the power consumption of the motor 100 and its associated current servo amplification/control apparatus accordingly becomes high in the case of the first embodiment (excluding the modification of the first embodiment).

On the other hand, in the second embodiment, the power consumption of the motor can be suppressed by using the appropriate motor drive (input) current when the motor 100 is rotating at its maximum speed range.

Referring to FIG. 11, the motor positioning control circuit block 180 includes: the robust compensator 130a; the model matching control block 130b; and the motor instruction current value determining circuit block 130cc (series-connected subtractors).

The motor current instruction value determining circuit block 130cc serves to add the output $I_{RB}$ ($I_R^*$ in the first embodiment) from the robust compensator 130a and the output $I_{MB}$ ($I_M^*$ in the first embodiment) of the model matching control block 130b to derive the current instruction value $I_B$ (I* in the first embodiment).

Figure 12:
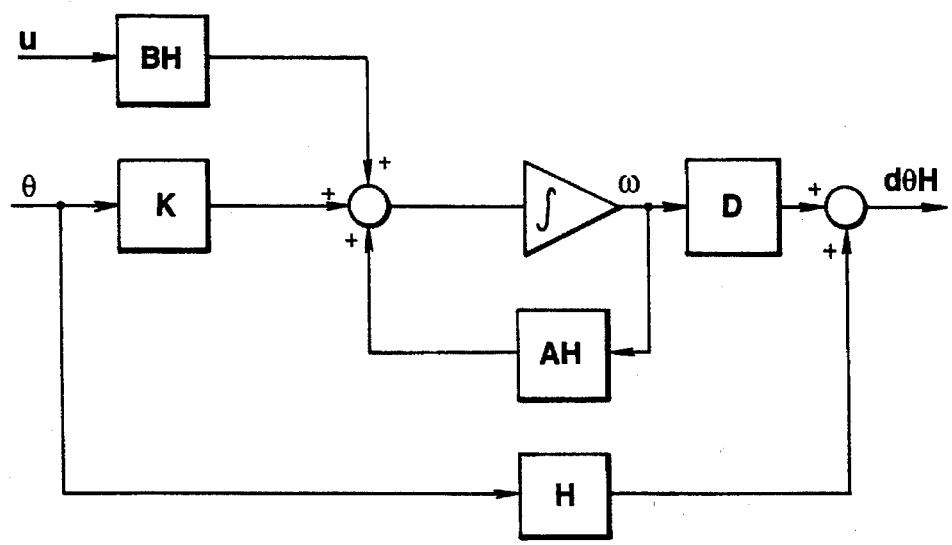
FIG. 12 is an explanatory circuit block diagram of another motor angular velocity estimator in the motor positioning control circuit block in the second embodiment.

The motor counter-electromotive force estimating circuit block 124 in the second embodiment constitutes the motor angular velocity estimator as shown in FIG. 12. The motor angular velocity estimator receives the motor current instruction value $I_B$, the motor positioning current $I_{MB}$, and motor angular position θ. The motor angular velocity estimator is formed according to the linearized transfer characteristic of the controlled object (,i.e., actuator, in details, DC motor 100 and its associated (steering) mechanism). As described in the first embodiment, the motor counter-electromotive force estimating circuit block 124 estimates the motor counter-electromotive force from the motor angular velocity estimated value $d\theta_H$ derived from the motor angular velocity estimator shown in FIG. 12 and the counter-electromotive force constant $K_R$ which is the specification value of the motor 100 and previously measured.

In the second embodiment, the subscript B denotes the target value and H denotes the estimated value.

Figure 13:
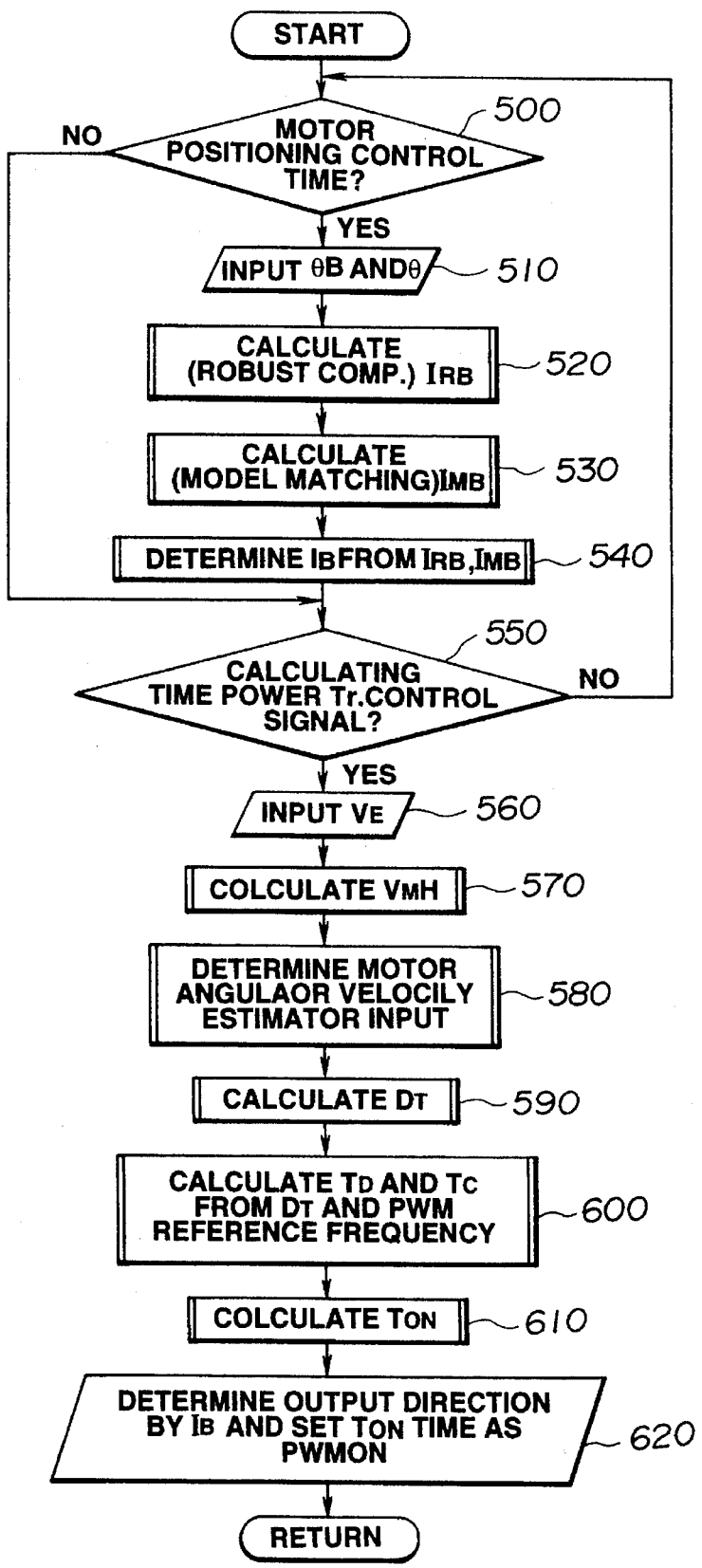
FIG. 13 is an operational flowchart executed by the current servo amplification/control apparatus in the case of the second embodiment.

FIG. 13 shows the operational flowchart of the controller 111 in the case of the second embodiment.

Since steps of 500 through 620 shown in FIG. 13 are generally the same as the steps 50 through 61 shown in FIG. 5, the detailed operation on the basis of FIG. 13 is omitted here. However, the explanation of the steps 580 and 590 shown in FIG. 13 will be described below.

The measured angular displacement θ of the controlled object (,i.e., the DC motor 100) is defined according to the linearized transfer characteristic by the robust compensator 130a and is expressed in the equation (1).

The state equation of the motor angular velocity estimator is expressed in the equations (2) and (3) and as viewed from FIG. 12, provided that # should be changed to H and * should be changed to $_B$.

Then, the counter-electromotive force generated by the rotating motor 100 is estimated as follows:

$$V_{RH} = K_R \cdot d\theta_H \quad (10).$$

Then, the maximum angular velocity generated by the DC motor 100 occurs due to a decrease in a motor effective voltage $V_M$ when the motor angular velocity a is large. The limitation of the motor angular velocity estimated value $d\theta_H$ is placed by calculating the input u of the motor angular velocity estimator as follows:

$$V_{MH} = V_E - V_{RH} \quad (11).$$

$$I_{MAX} = V_{MH}/R_M \quad (12).$$

In the equations (11) and (12), $V_{MH}$ denotes an estimated value of the effective voltage applied across the motor 100, $V_{RH}$ denotes the estimated value of the motor counter-electromotive force as defined in the equation (10), and $R_M$ denotes an armature (rotor) resistance of the motor 100.

Then, the input u of the motor angular velocity estimator is provided with the condition such as expressed as follows:

When $I_{MAX} \geq I_{MB}$, $u = I_{MB}$; and

When $I_{MAX} < I_{MB}$, $u = I_{MAX}$.

It is noted that $I_{MAX}$ defined above denotes a maximum current value flowing through the motor 100 when the motor is rotating at the maximum velocity (speed).

Next, at the step 590, the controller 110 calculates the PWM-DUTY ratio $D_T$ which is the ratio of the switching on time duration to the switching period $F_W$ of the power transistor circuit 110 as follows:

$$D_T = I_B/I_{MAX} \quad (13).$$

At the seep 600, $T_D$ and $T_C$ are calculated in the same way as the step 59 shown in FIG. 5.

At the step 610, $T_{ON} = T_D + T_C$.

At the step 620, the direction of the motor rotation is determined according to the motor instruction value $I_B$ and the power transistor switching control signal is output from the power transistor switching control block 123 in the same way as the step 61 shown in FIG. 5.

[Results of Simulations in the second embodiment]

FIGS. 14A, 14B, 14C, and 14D show the results of simulations of a rear road wheel steering angle instruction value, a rear road wheel steering angle, the motor angular velocity, and the motor drive current when the current servo amplification/control apparatus in the second embodiment is applied to the DC motor, namely, the drive source of the rear road wheel steering angle actuator (mechanism) of the vehicular four-wheel steering angle control system.

In FIGS. 14A through 14D, characteristic graphs denoted by the solid lines indicate the instruction value, a theoretical value, and actual angular velocity and those denoted by the dot-and-dash lines indicate the first embodiment wherein the maximum angular velocity determined according to the physical characteristic of the motor is not considered in the estimation of the counter-electromotive force.

As the results of simulations, in the characteristics shown in FIGS. 14A through 14D when the second embodiment is applied to the motor current servo amplification/control apparatus of the four-wheel (4WS) steering control system, the motor angular velocity is suppressed approximately up to 300 rad/sec and the estimated value of the motor angular velocity is generally coincident with the actual angular velocity of the motor (in other words, the high coincidence can be observed). On the other hand, since no limitation of the motor angular velocity was placed in the first embodiment), the motor angular velocity generally reached to approximately 400 lad/sec. (refer to FIG. 14C).

Figure 14A:
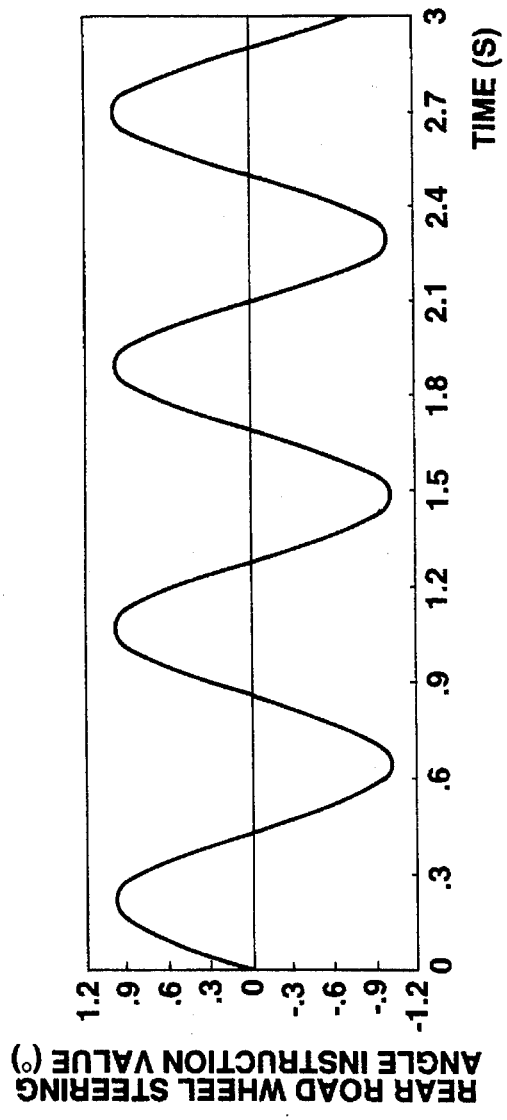
FIGS. 14A, 14B, 14C, and 14D are characteristic graphs of a rear road wheel steering angle instruction value, a rear road wheel steering angle, a motor angular velocity, and an actual motor drive current as results of simulations in the motor controlling apparatus in the case of the second embodiment when the above-described current servo amplification/control apparatuses in both first and second embodiments were actually applied to a motor-driven four-wheel steering (4WS) system of an automotive vehicle, respectively.
Figure 14B:
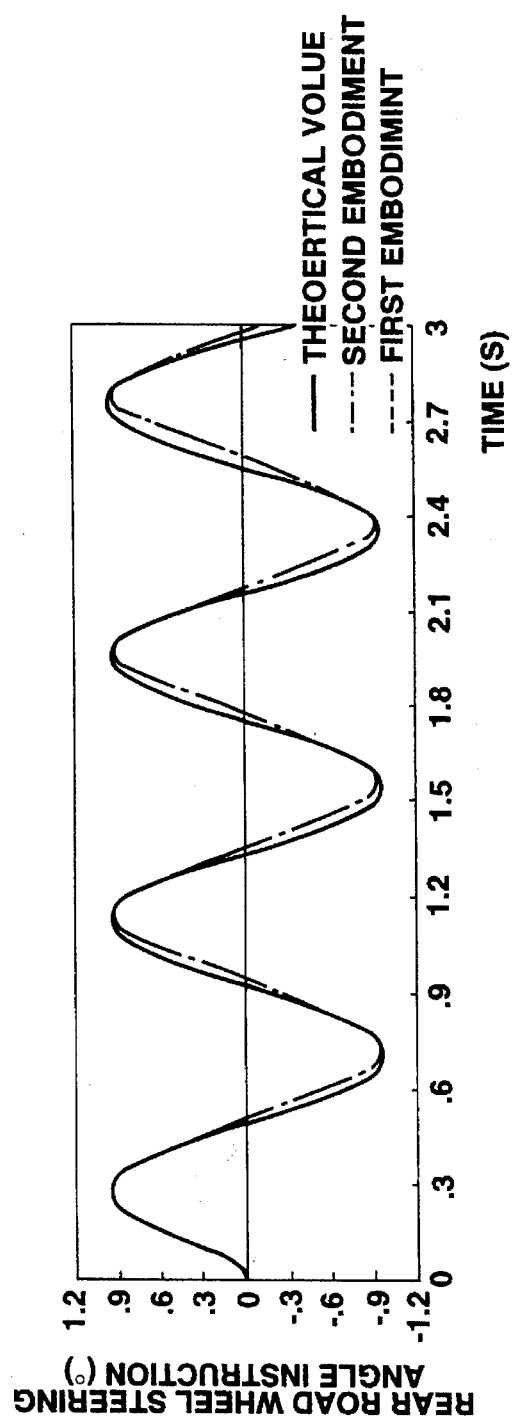
Figure 14C:
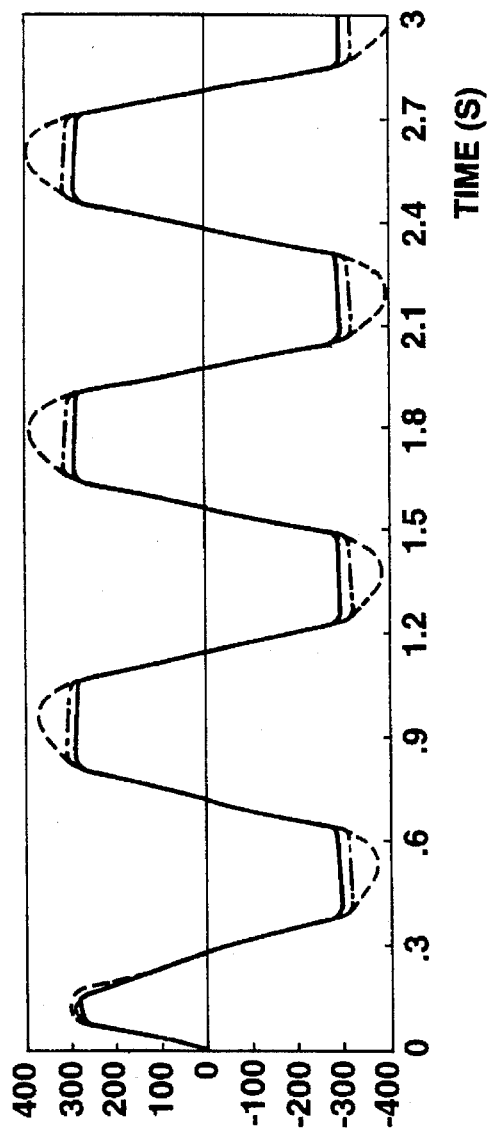
Figure 14D:
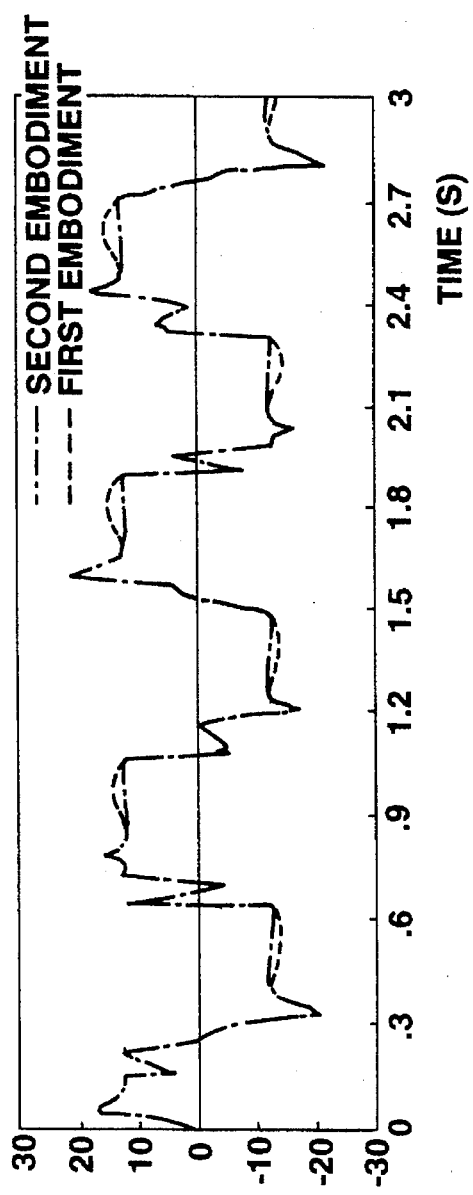

Consequently, when the characteristic graph of the drive current flowing through the DC motor in the case of the second embodiment (the dot-and-dash line) is compared with that (the broken line), as shown in FIG. 14D, the drive current in the case of the first embodiment flowed by an unnecessarily large magnitude of the motor drive current when the motor angular velocity fell in the excessively high speed range whereas in the case of the second embodiment the drive current was suppressed to a lowered range when the motor angular velocity fell in the excessively high speed range. That is to say, since, in the second embodiment, the above-described limitation is placed on the input u of the motor angular velocity, the estimation of the motor counter-electromotive force can be carried out more accurately than the case of the first embodiment in which no limitation of the input of the motor angular velocity estimator is placed. Consequently, it was confirmed that the unnecessary current was suppressed so as to derive the same rear road wheel steering angle as that in the case of the first embodiment and the power consumption could be lowered. The advantage of the second embodiment was confirmed to be effective.

As described hereinabove, since, in the current servo amplification/control apparatus and method for the reversible DC motor according to the present invention, the counter-electromotive force $V_R$ ($V_{RH}$) is estimated according to the dynamic characteristic of the motor 100, the motor positioning current $I_M^*$ ($I_{MB}$), and the angular position signal θ and the motor power supply voltage $V_E$ ($V_{ME}$) is corrected using the estimated counter-electromotive force $V_R$ ($V_{RH}$) so that the switching on-and-off time duration for the power transistor circuit is carried out on the basis of the corrected motor applied voltage, the current servo amplification/control apparatus can be cost-effective with no motor current detecting circuit block and current feedback circuit and can obtain the positioning response of the motor which is approximately coincident with the target characteristic (desired response).

In addition, since the limitation on the input u of the motor angular velocity estimator is placed, the contributivity of tile motor positioning current $I_M^*$ to the input current through the motor becomes evident and the more accurate estimation of the counter-electromotive force of the rotating motor can be achieved.

In addition, since the power transistor switching on-and-off time duration is controlled on the basis of $T_{ON}$ and the motor current instruction value $I^*$ ($I_B$), the motor drive (input) current I which is generally coincident with the motor current instruction value can be achieved irrespective of variations in the dynamic characteristics of the respective power transistors.

Furthermore, since in the second embodiment the counter-electromotive force is estimated from the estimation of the motor angular velocity with the maximum angular velocity of the motor determined by the physical characteristics of the motor taken into consideration, the power consumption of the motor can be suppressed according to the appropriate value of the motor drive current when the motor is rotating at the maximum speed range.

Other various advantages can be achieved by the present invention. The present invention is applicable to any other control system using the DC motor than the vehicular motor-driven four-wheel steering system.

The invention should be understood to include all possible embodiments and modification to the shown embodiments which can be embodied without departing from the principle of the invention as set forth in the appended claims.

What is claimed is:

1. An apparatus comprising:

a) a reversible DC motor;

b) a power transistor circuit which is connected across the DC motor so as to supply an input current to rotate the DC motor in response to a switching on signal;

c) power supply voltage detecting means for detecting a power supply voltage ($V_E$) by which a power to drive the DC motor is supplied via said power transistor circuit;

d) motor rotation angular position detecting means for detecting a rotation angular position θ of the motor;

e) robust compensating means for receiving the angular position θ of the motor, for converting a motor dynamic characteristic into an identified model having a constant linearized transfer function, and for calculating and outputting a motor dynamic characteristic compensation current ($I_R^*$, $I_{RB}$) such that a response of the motor is coincident with the identified model;

f) model matching control means, responsive to a motor rotation instruction value (θ* $θ_B$) from an external of the apparatus, for calculating and outputting a motor rotation positioning current ($I_M^*$, $I_{MB}$) to achieve a rotation positioning of the motor and rotation positioning response of the motor which are desired by a designer of the apparatus;

g) motor input current instruction value determining means for receiving the motor dynamic characteristic compensation current ($I_R^*$, $I_{RB}$) of said robust compensating means and the motor positioning current ($I_M^*$, $I_{MB}$) of said model matching control means and for determining a motor input current instruction value ($I_R^*$, $I_{RB}$) on the basis of the motor dynamic characteristic compensation current ($I_R$, $I_{RB}$) of said robust compensating means and the motor positioning current ($I_M^*$, $I_{MB}$) of said model matching control means;

h) counter-electromotive force estimating means for receiving the motor angular position (θ) and at least the motor positioning current ($I_M^*$ $I_{MB}$) of said model matching control means, for estimating an angular velocity (dθ#, $dθ_H$) of the motor using the constant linearized transfer function in said robust compensating means on the basis of the angular position (θ) and motor positioning current ($I_M^*$, $I_{MB}$) and for estimating a counter-electromotive force ($V_R$, $V_{RB}$) generated in said rotating motor from the estimated angular velocity (dθ#, $dθ_H$) of the motor;

i) storing means for storing previously measured specification values of said motor, operational parameters in linearized transfer function, and internal impedances of said power transistor circuit;

j) basic switching on duration calculating means for receiving the specification values of said motor, the impedance values of said power transistor circuit, the motor power supply voltage value ($V_E$), and estimated counter-electromotive force value ($V_R$, $V_{RH}$) and for calculating a basic switching on duration ($T_D$) of said power transistor circuit on the basis of the received values thereinto; and k) power transistor switching control means for generating the switching on signal ($T_{ON}$) to be supplied to said power transistor circuit on the basis of the motor input current instruction value ($I^*$, $I_B$) and the basic switching on duration ($T_D$).

2. An apparatus as claimed in claim 1, wherein said linearized transfer function in said robust compensating means is expressed as:

$$θ = n_{m0}/(s^2 + d_{m1}s + d_{m0}),$$

wherein s denotes a differential operator and $n_{m0}$, $d_{m1}$, and $d_{m0}$ denote the operational parameters of the motor, and wherein said counter-electromotive force estimating means includes a motor angular velocity (dθ#, $dθ_H$) estimator and the angular velocity of the motor is estimated from the following equations:

$d\omega/dt = A\#\cdot\omega + K\theta + B\#\cdot u$, and $d\theta\# = D\omega + H\theta$, $A\# = -d_{m1} - L$, $B\# = Ln_{m0}$, $K = -L(d_{m1}+L) - d_{m0}$, D is 1, H=L (L denotes a constant arbitrarily set by the designer), ω is an integral value of dω/dt, t denotes time, and u denotes a current value input to the motor angular velocity estimator.

3. An apparatus as claimed in claim 2, wherein $u = I_M^*$.

4. An apparatus as claimed in claim 3, wherein $V_R = K_R \cdot d\theta\#$, wherein $K_R$ denotes one specification value of the motor and denotes a motor counter-electromotive force constant.

5. An apparatus as claimed in claim 4, wherein $D_T = I^*/I_{max}$ and $I_{max} = (V_E - V_R)/R_M$, wherein $R_M$ denotes a motor armature resistance as one specification value of the motor.

6. An apparatus as claimed in claim 2, wherein said motor input current instruction value determining means includes a current limiter which is so constructed as to limit the current flowing through the motor, the limit value of the limiter being set by the designer.

7. An apparatus as claimed in claim 6, wherein said angular velocity estimator input u has conditions such that $u = I_M^*$ when $I^* \leq I_{max}$ ($I_{max}$ denotes a maximum current flowing through the motor and is set in said current limiter), $u = I_M^* - \{I_R - (I_{max} - I_M^*)\}/2$ when $I^* > I_{max}$ and $I_M^* \leq I_{max}$, and $u = I_{max}$ when $I^* > I_{max}$ and $I_M^* > I_{max}$.

8. An apparatus as claimed in claim 2, wherein said motor angular velocity estimator input u has conditions such that $u = I_{MB}$ when $I_{MAX} \geq I_{MB}$, wherein $I_{MAX} = V_{MH}/R_M$, $V_{MH} = V_E - V_{RH}$, and $I_{MAX}$ denotes a maximum current flowing through the motor when the motor is rotating at a maximum speed, and $u = I_{MAX}$ when $I_{MAX} < I_{MB}$.

9. An apparatus as claimed in claim 8, wherein said motor angular velocity estimator is a minimal order observer and said motor i.s applied to an actuator of a rear road wheel steering mechanism in a vehicular four-wheel steering system.

10. An apparatus comprising:

a) a reversible DC motor;

b) a power transistor circuit which is so constructed as to operatively supply a motor input current to the motor;

c) first means for monitoring a power supply voltage $V_E$ across the motor;

d) second means for detecting an angular displacement of the motor;

e) third means for calculating a target motor input current $I_R^*$ to always make a dynamic characteristic of the motor constant so as to compensate for the dynamic characteristic of the motor;

f) fourth means for a motor positioning current $I_M^*$ to derive posi tioning characteristic and responsive characteristic of the motor which are desired by a designer to achieve;

g) fifth means for determining a motor current instruction value I* on the basis of the target motor input current $I_R^*$ and the motor positioning current $I_M^*$;

h) sixth means for estimating a counter-electromotive force generated by the motor using the dynamic characteristic made constant at the third means on the basis of the motor positioning current $I_M^*$ and the angular displacement of the motor;

i) seventh means for storing previously measured impedances of the motor and said power transistor circuit;

j) eighth means for determining a basic power transistor switching on duration $T_D$ of the power transistor circuit on the basis of the monitored power supply voltage, the counter-electromotive force, and the impedances of the motor and power transistor circuit; and k) a power transistor switching circuit which is so constructed as to control switching on and off of the power transistor circuit on the basis of the motor current instruction value I* and the basic power transistor switching on duration.

11. An apparatus as claimed in claim 10, wherein said sixth means uses a current value u used to estimate the counter-electromotive force of the motor when a maximum current input to tile motor is limited, if $I^* \leq I_{max}$, $u = I_M^*$;

if $I^* > I_{max}$ and $I_M^* \leq I_{max}$, $u = I_M^* - \{I_R^* - (I_{max} - I_M^*)\}/2$; and if $I^* > I_{max}$ and $I_M^* > I_{max}$, $u = I_{max}$, wherein $I_{max}$ denotes a maximum value of the motor input current I and which is set in a current limiter constituting said fifth means.

12. An apparatus as claimed in claim 10, wherein said sixth means estimates the counter-electromotive force with a maximum angular velocity determined according to a physical characteristic of the motor taken into consideration.

13. An apparatus as claimed in claim 11, which further comprises ninth means for measuring a counter-electromotive force constant $K_R$ that the motor naturally has and wherein said sixth means estimates the counter-electromotive force of the motor as $V_R = K_R \cdot d\theta\#$, wherein $d\theta\#$ denotes an estimated value of a motor angular velocity, $d\theta\# = D\omega + H\theta$, $d\omega/dt = A\#\cdot\omega + K\theta + B\#\cdot u$, $u = I_M^*$, $A\# = -d_{m1} - L$, $B\# = Ln_{m0}$, $K = -L(d_{m1}+L) - d_{m0}$, D is 1 and H=L. (L denotes a constant arbitrarily set by the designer).

14. An apparatus as claimed in claim 13, wherein said sixth means comprises a robust compensator which carries out a derivation of a linearized transfer characteristic off tile motor represented by $\theta = n_{m0}/(s^2 + d_{m1}s + d_{m0})$, wherein s denotes a Laplace transform operator as a differential operator.

15. An apparatus as claimed in claim 14, wherein said eighth means determines the basic power transistor switching on duration $D_T$ at a power transistor switching period $F_W$ as follows: $D_T = I^*/I_{MAX}$, wherein $I_{MAX} = (V_{E1} - _{VR})/R_M$, $R_M$ denotes a motor armature resistance.

16. An apparatus as claimed in claim 15, wherein said ninth means controls the power transistor switching on duration $T_{ON}$ as $T_D + T_C$, wherein $T_D = D_T/F_W$, $T_C = (1/T_G)\{1 - \exp(-t/T_G)\} + L_G$, $T_G = R_1 \times C_1$, $L_G$ denotes a previously measured power transistor gate switching delay time.

17. An apparatus as claimed in claim 12, wherein said eighth means derives an effective value of the motor counter-electromotive force $V_{RM}$ as follows: VMH (an estimated effective value of the motor power supplied voltage)= $V_E - V_{RH}$, $I_{MAX} = V_{MH}/RM$ ($R_M$ denotes an armature resistance of the motor) and wherein the motor input current u used to estimate a motor angular velocity as follows:

when $I_{MAX} \geq I_M$, $u = I_M$, and when $I_{MAX} < I_M$, $u = I_{MAX}$ ($I_{MAX}$ denotes a value of the current input through the motor when the motor is rotating at its maximum speed.

18. An apparatus as claimed in claim 10, wherein said power transistor circuit comprises a first MOS transistor whose drain is connected to the motor power supply, whose source is connected to one end of the motor, whose gate is connected to the power transistor switching circuit, a second MOS transistor whose drain is connected to the source of the first MOS transistor, whose source is grounded, and whose gate is connected to the power transistor switching circuit, a third MOS transistor whose drain is connected to the motor power supply, whose gate is connected to the power transistor circuit, and whose source is connected to the other end of the motor, and fourth MOS transistor whose drain is connected to the source of the third MOS transistor, and whose source is grounded, and whose gate is connected to the power transistor switching circuit and wherein said motor is applied to a vehicular four wheel steering system.

19. A method of a current servo amplification/control for a reversible DC motor, comprising the steps of:

a) detecting a power supply voltage ($V_E$) by which a power to drive the DC motor is supplied via a power transistor circuit connected across the motor;

b) detecting a rotation angular position θ of the motor;

c) receiving the angular position θ of the motor, converting a motor dynamic characteristic into an identified model having a constant linearized transfer function, and calculating and outputting a motor dynamic characteristic compensation current ($I_R^*$, $I_{RB}$) such that a response of the motor is coincident with the identified model;

d) responding to a motor rotation instruction value (θ*, $θ_B$) from an external calculating and outputting a motor rotation positioning current ($I_M^*$, $I_{MB}$) to achieve a rotation positioning of the motor and rotation positioning response of the motor which are desired by a designer off the apparatus;

e) receiving the motor dynamic characteristic compensation current ($I_R^*$, $I_{RB}$) and the motor positioning current ($I_M^*$, $I_{MB}$) and determining a motor input current instruction value ($I_R^*$, $I_{RB}$) on the basis of the motor dynamic characteristic compensation current ($I_R^*$, $I_{RB}$) and the motor positioning current ($I_M$, $I_{MB}$);

f) receiving the motor angular position (θ) and at least the motor positioning current ($I_M^*$, $I_{MB}$) of said model matching control means, estimating an angular velocity (dθ#, $dθ_H$) of the motor using the constant linearized transfer function on the basis of the angular position (θ) and motor positioning current ($I_M^*$, $I_{MB}$) and estimating a counter-electromotive force ($V_R$, $V_{RB}$) generated in said rotating motor from the estimated angular velocity (dθ#, $dθ_H$) of the motor;

g) storing previously measured specification values of said motor, operational parameters in linearized transfer function, and internal impedances of said power transistor circuit;

h) receiving the specification values of said motor, the impedance values of said power transistor circuit, the motor power supply voltage value ($V_E$), and estimated counter-electromotive force value ($V_R$, $V_{RH}$) and calculating a basic switching on duration ($T_D$) for said power transistor circuit on the basis of the received values thereinto; and i) generating the swit,ching on signal ($T_{ON}$) to be supplied to said power transistor circuit on the basis of the motor input current instruction value (I* $I_B$) and the basic switching on duration ($T_D$).

\* \* \* \* \*